United States Patent [19]
Itoh et al.

[11] Patent Number: 5,696,576
[45] Date of Patent: Dec. 9, 1997

[54] METHOD OF ACCEPTING PRINT ORDER

[75] Inventors: Takeyoshi Itoh; Toru Nishimura, both of Asaka, Japan

[73] Assignee: Fuji Photo Film Co., Ltd., Kanagawa, Japan

[21] Appl. No.: 522,096

[22] Filed: Aug. 31, 1995

[30] Foreign Application Priority Data

Sep. 6, 1994 [JP] Japan ................... 6-212761

[51] Int. Cl.$^6$ ........................................ G03B 27/52
[52] U.S. Cl. ........................ 355/40; 355/39; 355/42
[58] Field of Search ....................... 355/39, 40, 42

[56] References Cited

U.S. PATENT DOCUMENTS 4,878,075  10/1989  Cannon .

FOREIGN PATENT DOCUMENTS 575922  3/1993  Japan .

Primary Examiner—Arthur T. Grimley
Assistant Examiner—Shival Virmani

[57] ABSTRACT

A magnetic track on a photographic film is provided with a record region in which a renewal code or a flag indicating that a processing for an order to be completed is recorded. When print order information is renewed, the renewal code or the flag is renewed or cleared. As a result, it can be automatically judged whether the print order information recorded in the magnetic track is the same as one at the time of a previous order, and a processing at a laboratory can be automatically carried out. The print order information is classified into plural types of information including information to be rewritten for every order and information not to be rewritten for every order. At a laboratory, the print order information to be rewritten for every order is automatically deleted or reset before returning the photographic film to the user.

32 Claims, 18 Drawing Sheets

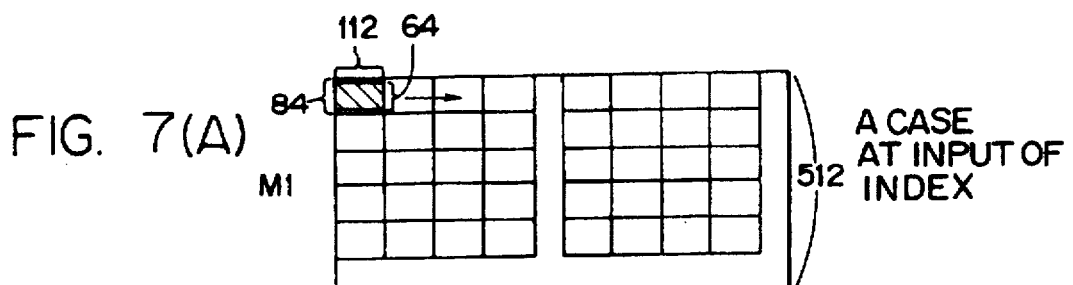
FIG. 7(A)  A CASE AT INPUT OF INDEX
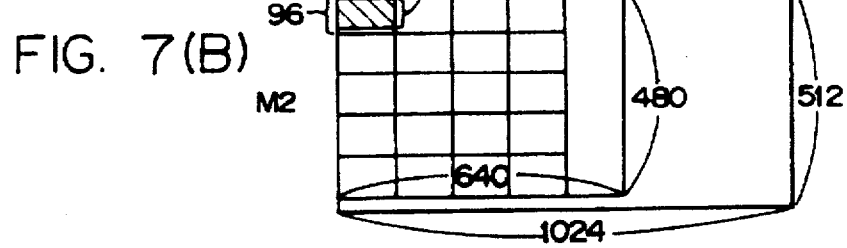
FIG. 7(B)  ENLARGE TRANSFER
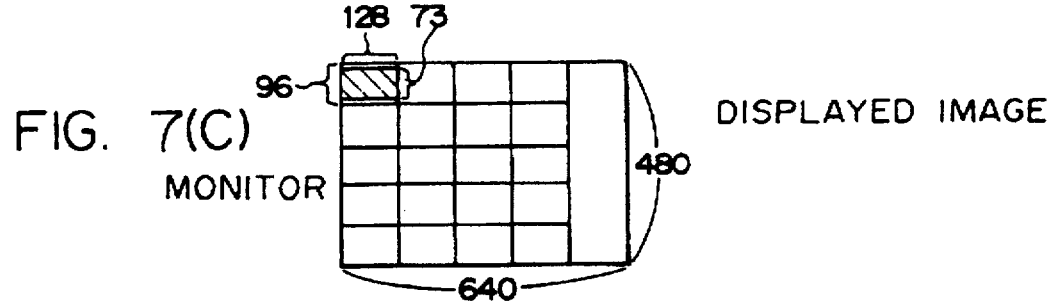
FIG. 7(C) MONITOR  DISPLAYED IMAGE
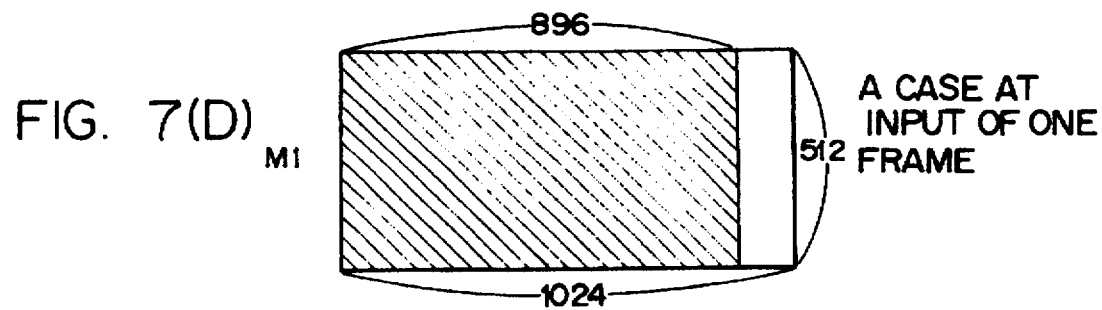
FIG. 7(D)  A CASE AT INPUT OF ONE FRAME

FIG. 11

```
CARTRIDGE ID   38905678
DATE                    1/25/95
SIZE        EC Ⓛ K 2L
PAPER SURFACE    G(RO)SS  SILK
FRAME FOR ADDITIONAL COPIES
            1  2  3  4  5  6  7  8  9  10
NUMBER      2     1     3
PHL         H     L     P
ZOOM              v     v
CHARACTER         v
```

| | 1 | 2 | 3 | 4 | 5 | 6 | 7 | 8 | 9 | 10 |
|---|---|---|---|---|---|---|---|---|---|---|
| NUMBER | 2 | | 1 | | 3 | | | | | |
| PHL | H | | L | | P | | | | | |
| ZOOM | | | v | | v | | | | | |
| CHARACTER | | | v | | | | | | | |

NAME

SHOP ID _____    PERSON IN CHARGE

FIG. 12

```
CARTRIDG ID      38905678
DATE             1/25/95
SIZE       E C Ⓛ K 2 L
PAPER SURFACE    G(RO)SS  SILK
PRINT NUMBER          10
NUMBER FOR ZOOMIG   1 / 0 / 9
NUMBER FOR PHL        2
NUMBER FOR TITLED/    5
DATED PRINT
FRAME FOR ADDITIONAL COPIES
  ① 2 3 4 5 6 7 8 9 10
  11 12 ⑬ 14 15 16 17 18 19 20
  21 22 23 24 ㉕ 26 27 28 29 30
  31 32 ㉝ 34 35 36 37 38 39 40
```

NAME

SHOP ID _____    PERSON IN CHARGE

METHOD OF ACCEPTING PRINT ORDER

BACKGROUND OF THE INVENTION

1. Field of the Invention

The present invention relates to a method of accepting a print order, and more particularly to a method of accepting a print order for a roll of photographic film in which print order information is recorded in a magnetic track thereon.

2. Description of the Related Art

Conventionally, a roll of developed negative film is cut into six-frame negative pieces, which are respectively inserted into a transparent negative film sleeve and are returned to a customer. Therefore, when a customer places a print order at a development agency, he confirms a negative film to be printed, and then writes the number of prints directly in a column corresponding to the negative film of the sleeve.

On the other hand, a camera is disclosed in U.S. Pat. No. 4,878,075, in which a photographic film coated with a transparent magnetic substance so as to form a magnetic layer thereon is employed and photographic data is recorded in a predetermined magnetic track of the magnetic layer at the time of photographing. Further, as a film returning method from a laboratory, it is proposed that a film cartridge storing a roll of developed film is returned to a customer from the laboratory. The film player of Japanese Patent Application Laid-open No. 5-75922 uses this film cartridge. This film player picks up a developed still photographic film by means of an image sensor, converts the image on the photographic film into an image signal, and outputs it to a monitor TV so as to display the film image.

It is also possible to hand over a film cartridge to a development agency so as to place a print order by means of the film cartridge in which information as to a print order to a laboratory is recorded in a magnetic track corresponding to each frame track thereof by means of the above-described film player. In this case, the print order is accepted by making use of information recorded in the film cartridge at the development agency, and then the film cartridge is delivered to the laboratory.

In this ordering system, the order is placed by means of the print order information, which is recorded in the magnetic track, and/or by means of an order sheet. Here, the print order has to be placed correctly.

SUMMARY OF THE INVENTION

The present invention has been developed in view of the above-described circumstances, and has its aim the provision of a method of accepting a print order, in which the print order is correctly accepted when the print order is placed by means of a print order information which is recorded in a magnetic track on a photographic film or/and an order sheet.

To achieve the above-mentioned objects, in a method of accepting an order in which a first magnetic track for a user and a second magnetic track for a laboratory are provided on a roll of photographic film and print order information is recorded in the first and second magnetic tracks, the first and second magnetic tracks are respectively provided with a record region in which a first and a second renewal codes are recorded, the first renewal code is renewed and recorded every time the print order information is recorded in the first magnetic track, and the second renewal code which is recorded in the second magnetic track is replaced with the first renewal code at the time of a processing in a laboratory.

Instead of the first and second renewal codes, it is also possible to apply a flag which indicates a process for an order is completed. In this case, a record region for the flag is provided in the magnetic track. The flag is cleared at the time of renewing the print order information, and the flag is set at a laboratory.

As a result, in the development agency and the like, it can be recognized that the information as to the order recorded in the first magnetic track is the same as that of the previous order when the first and second renewal codes correspond to each other, or the flag is set. It can be also confirmed to the user as to whether the order is the same as the previous one.

Further, according to the present invention, in a method of accepting a print order in which a first magnetic track for a user and a second magnetic track for a laboratory are provided on a roll of photographic film and print order information is recorded in the first and second magnetic tracks, it is judged whether there is an order by making use of print order information which is recorded in the first magnetic track. The print order information which is recorded in the first magnetic track is preferentially used when it is judged that there is the order. The print order information which is recorded in the second magnetic track is preferentially used when it is judged that there is no order, and the preferentially used print order information is written in the second magnetic track. In the case when there is a print order placed by means of an order sheet, only information corresponding to a print order placed by means of the order sheet within the print order information which is preferentially used is replaced by the information on the order sheet so as to be written in the second magnetic track. Moreover, the first and second renewal codes are compared with each other so as to judge whether there is the print order or not. It is also possible to make use of the flag which is set or cleared so as to judge whether there is the print order or not.

Furthermore, in a method of accepting a print order in which print order information is recorded in a magnetic track on a roll of photographic film, the print order information recorded in the first and second magnetic tracks is classified into plural kinds of information which include at least information to be rewritten for every order and information not to be rewritten for every order, the information which is to be rewritten for every order is automatically deleted or reset after printing and before returning the photographic film to the user. As a result, even though the magnetic information other than the actual print information still remains, and it is possible to prevent the magnetic information from being processed. Moreover, there is information which is not desired to be rewritten once it is inputted (for example, close-up information, frame title information, and so forth) within the magnetic information which is recorded in the magnetic track. Accordingly, it is possible to provide the magnetic track with an additional bit for the print order information. In this case, a piece of information indicating validity/invalidity of a print order is recorded in said additional bit, and, it is predetermined that a laboratory does not accept said print order information for which invalid information is recorded in said additional bit. As a result, it is not required to input the close-up information etc. once more at the time of automatically regenerating the film.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIGS. 7(A), 7(B), 7(C), and 7(D) are views illustrating a storage region in a CCD buffer and a display buffer and a display screen of a monitor TV in a film player of FIG. 2;

FIG. 11 is a view illustrating one example of an order certificate which is made by an automatic accepting equipment of FIG. 1;

FIG. 12 is a view illustrating the other example of an order certificate which is made by an automatic accepting equipment of FIG. 1;

DESCRIPTION OF THE PREFERRED EMBODIMENT

Detailed description will hereunder be given of the preferred embodiment of a method of accepting a print order according to the present invention with reference to the accompanying drawings.

Figure 1:
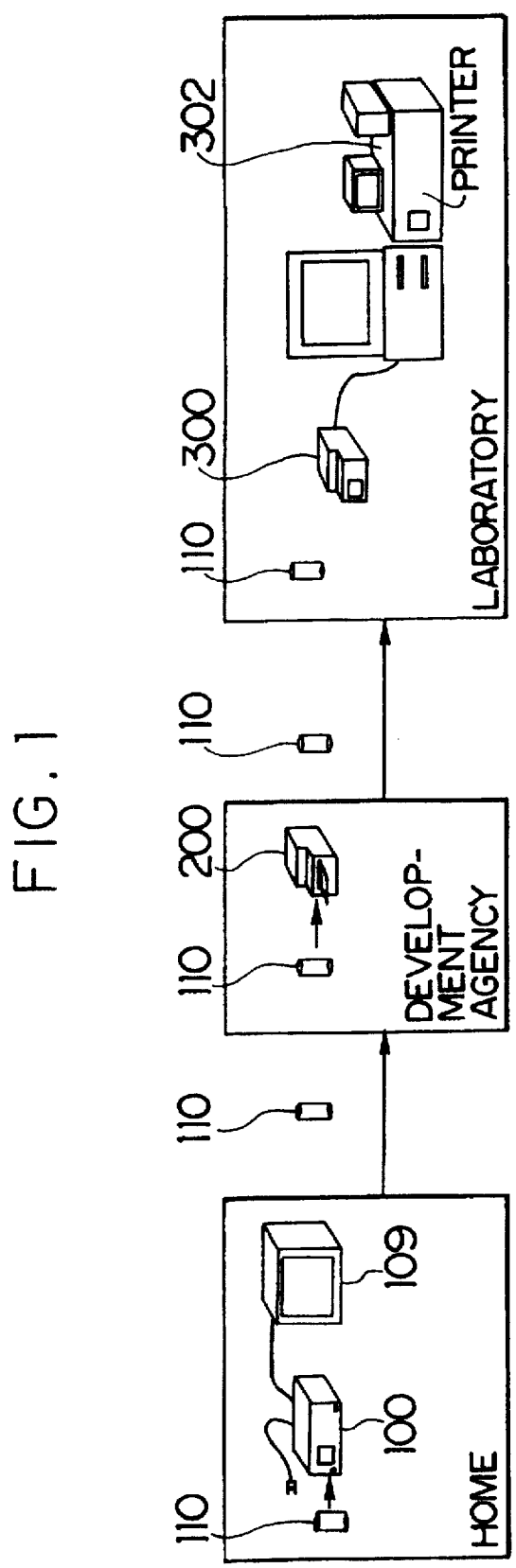
FIG. 1 is a view illustrating the entire system when a printing order is placed by use of a roll of photographic film to which the present invention is applied.

FIG. 1 is an entire system in which a print order is placed by use of a roll of photographic film to which the present invention is applied.

As shown in FIG. 1, at home, print order information is recorded in a magnetic track on the film within a film cartridge 110. When a user hands over the film cartridge 110, in which the information as to the print order (hereinafter referred as print order information) is recorded, to a development agency, the print order information is read from the film cartridge 110 by an automatic accepting equipment 200, and an order certificate is made. Then, a copy of the order certificate is handed over to the user, and the film cartridge 110 is delivered to a laboratory.

At the laboratory, the print order information is read from the film cartridge 110 by a magnetic information reading apparatus 300. Additional copies of a print are taken by a printer 302 in accordance with the readout print order information. A detailed explanation will be given of processing at home, the development agency and the laboratory.

Figure 2:
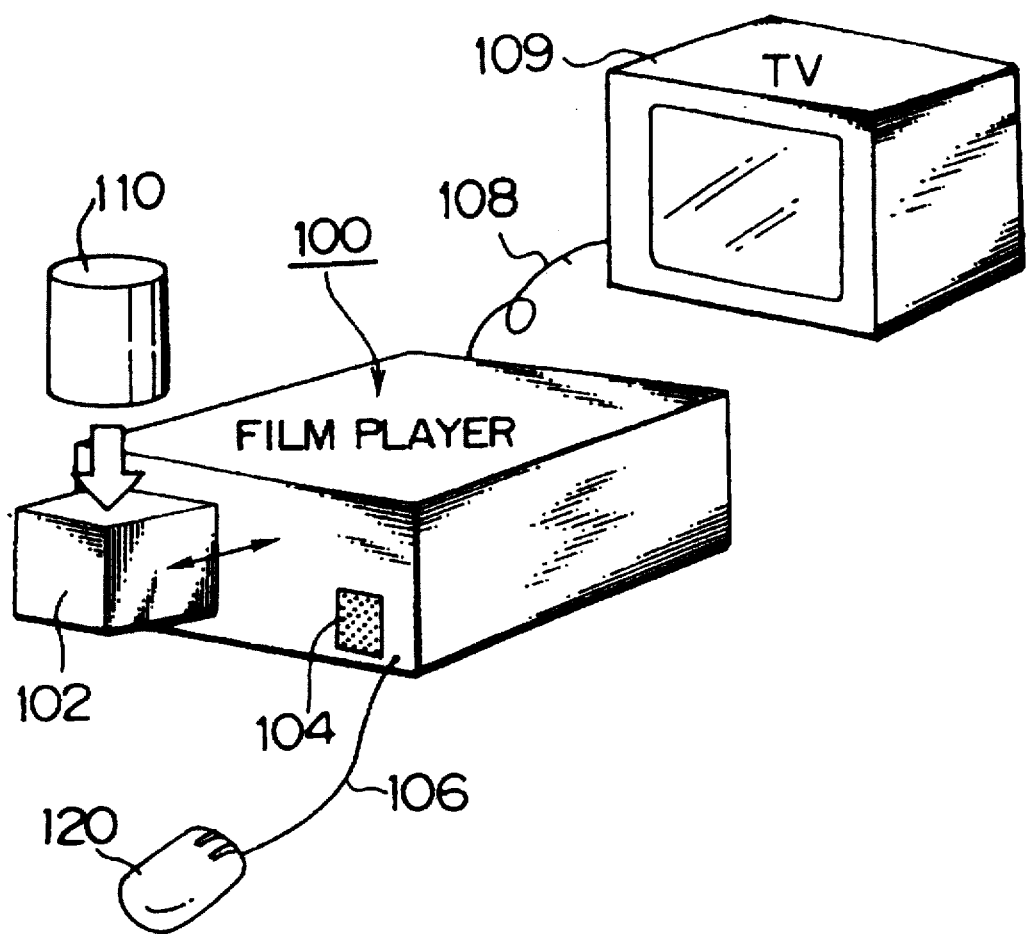
FIG. 2 is an external view of a film player which is used at home of FIG. 1.

FIG. 2 is an external view of the film player 100 which is used at home. As shown in FIG. 2, the film player 100 has a rectangular-parallelepiped shape, and a film cartridge tray 102 and a power source switch 104 are provided on the front surface of it. The film cartridge tray 102 is driven to move forward and backward when the film cartridge 110 is loaded/unloaded, so that a film cartridge is housed or taken out.

A mouse 120 and a TV monitor 109 are connected to the film player 100, and various kinds of operational signals are transmitted from the mouse 120 to a film player 100 via a signal cable 106 so as to control the film player 100. A video signal is transmitted from the film player 100 to the TV monitor 109 via a signal cable 108. A detailed explanation will be given later of the mouse 120 controlling the film player 100.

Figure 3:
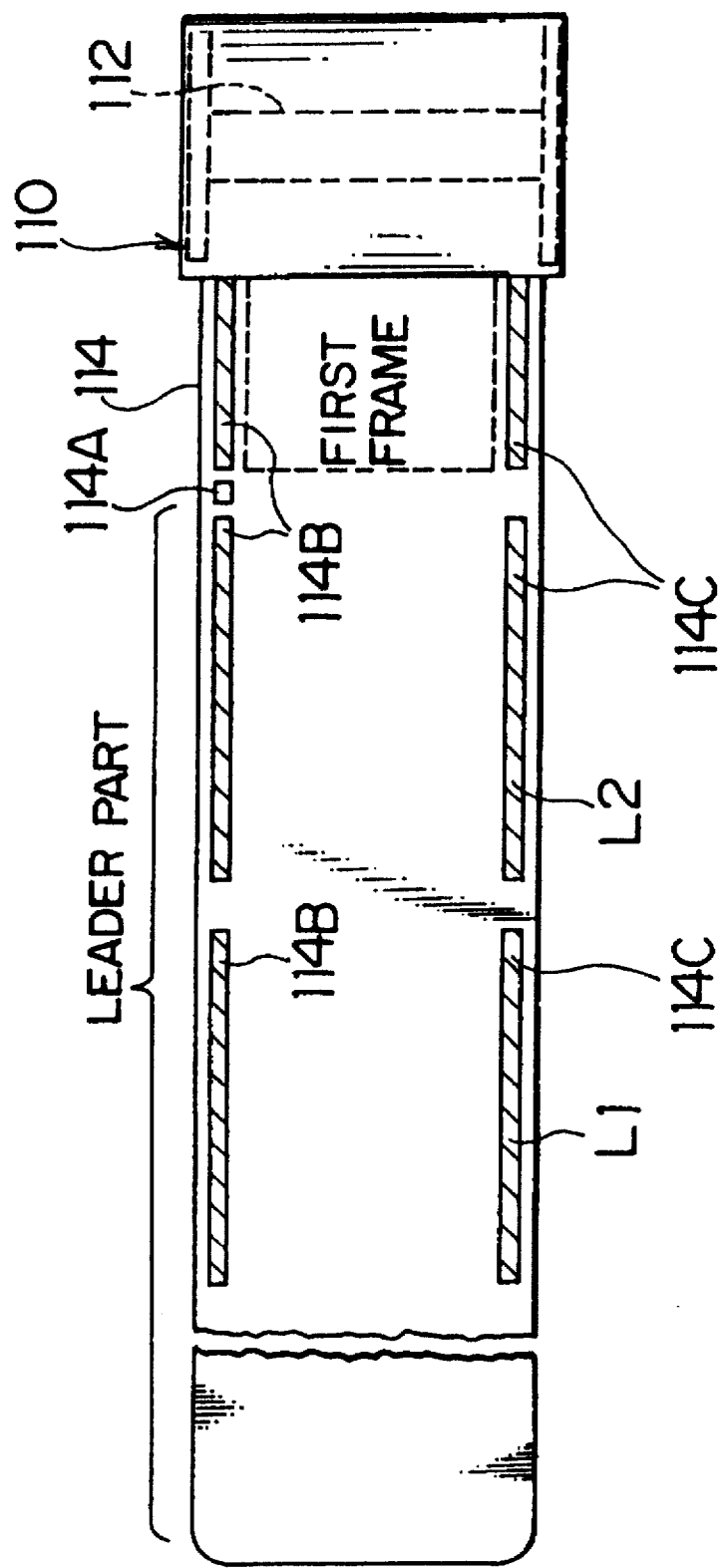
FIG. 3 is a view illustrating one example of a film cartridge to which a method of accepting a print order according to the present invention is applied.

The film cartridge 110 has a single spool 112 as shown in FIG. 3, and a photo film 114 is wound around the spool 112. A perforation 114A is formed on the photo film 114 so as to indicate a position of each frame. And, a transparent magnetic layer is provided in the photo film 114, and magnetic tracks 114B and 114C are formed on the edge of the film. The magnetic track 114B is a track which is used in a laboratory and a development agency, and the magnetic track 114C is a track which is used by the user.

Here, in a roll of the film, a part between the forward end of the film and the perforation 114A which indicates the position of the first frame is called a leader part, and the part of the film following the perforation 114A indicating the first frame is called a frame part. The magnetic tracks 114C locating in the leader part are called leader tracks L1 and L2, and the magnetic track locating in the frame part is called a frame track. Information concerning the film as a whole is recorded in the leader track and, information relating to each frame is recorded in each frame track.

The magnetic information is recorded in these tracks by a camera which is provided with a magnetic head, a film player 100 and the like. The magnetic information which is recorded by the camera relates to, for example, photographing conditions, pseudo-zooming, frame numbers, print format which indicates whether the image is high-definition, panoramic, or normal image, the date/time of photographing, and so forth, and many kinds of information can be recorded by the camera.

Furthermore, the data relating to a type of a film, a bar code indicating frame numbers and a frame format which is made by the light source provided in the camera, etc. can be optically recorded on the photographic film 114 except for the frame area which is exposed by the light of the subject. The developed photo film 114 is wound into the film cartridge 110, so that it can be stored.

Figure 4:
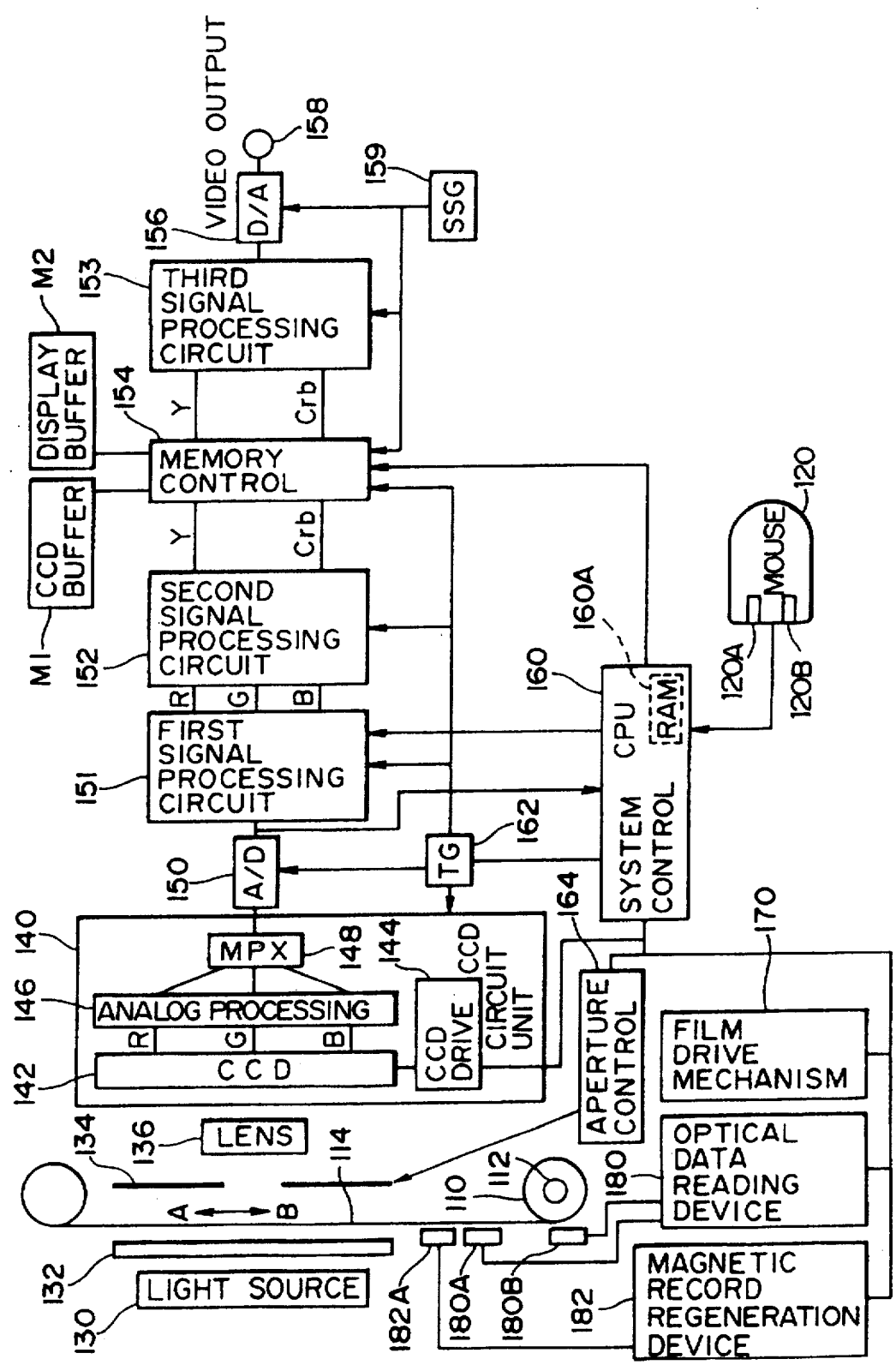
FIG. 4 is a block diagram illustrating one embodiment for the inner structure of a film player of FIG. 2.

FIG. 4 is a block diagram illustrating one embodiment of the inner structure of the film player 100. The film player 100 mainly comprises a light source 130 for illumination, a taking lens 136, a CCD circuit unit 140 which includes a CCD line sensor 142, a first signal processing circuit 151, a second signal processing circuit 152, a third signal processing circuit 153, a memory control circuit 154, a CCD buffer M1, a display buffer M2, a central processing unit (CPU) 160, a film drive mechanism 170, an optical data reading device 180, a device for magnetic recording and regeneration 182 and the like.

The light source 130 is a long fluorescent light which is provided in the direction perpendicular to the feed direction of the film 114, and illuminates the film 114 through an infrared cutting filter 132. The light, which has ben transmitted through the film 114, is formed on the light-accepting surface of the CCD line sensor 142 through the taking lens 136 which is a fixed-focus type. While the CCD line sensor 142 is picking up the film image, the film 114 is moved in the direction of an arrow A (hereafter referred to as a forward direction) or in the direction of an arrow B (hereafter referred to as a backward direction) at a fixed speed by the film drive mechanism 170. Detailed description will be given of the film drive later.

The CCD line sensor 142 is provided in the direction perpendicular to the film feed direction. And, the image light formed on the light-accepting surface of the CCD line sensor 142 is charged for a predetermined period of time in each sensor which has R, G and B filters, and then is converted into R, G and B signal charge in accordance with the light strength. The signal charge is sent to a shift register by a lead gate pulse of a predetermined cycle, which is added by a CCD drive circuit 144, and is sequentially read out by a register transfer pulse.

The CCD line sensor 142 has, for example, a sensor of 1024 picture elements in the direction perpendicular to the film feed direction. The number of picture elements in the same direction as the film feed direction of one frame changes according to the film feed speed when a cycle of the lead gate pulse, etc. in the CCD drive circuit 144 does not change. In this embodiment, when the film feed sped is ½, 1, 8, 16 times as fast as that in the case when the standard film image is picked up, the number of picture elements is 1792, 896, 112, and 56 respectively.

The signal charge which has been read out from the CCD line sensor 142 is clamped by a CDS clamp and transmitted to an analog processing circuit 146, and gain and the like of R, G and B signals are controlled in the circuit 146. The multiplexer 148 dot-sequentially transmits R, G and B signals which are sent from the analog processing circuit 146, and the R, G and B signals are converted into digital signals by the A/D converter 150, and then added to the first signal processing circuit 151 and the CPU 160.

The first signal processing circuit 151 includes a white-balance adjustment circuit, a negative-positive inversion circuit, a γ-correction circuit, a RGB circuit which transmits R, G and B signals simultaneously, and so forth, and sends R, G and B signals to the second signal processing circuit 152 after signal-processing the dot-sequential R, G and B signals, which are sequentially added, in each circuit. The white-balance adjustment circuit in the first signal processing circuit 151 carries out the white-balance adjustment in accordance with a control signal which is added by the CPU 160, and a detailed explanation on it will be given later.

The second signal processing circuit 152 has a matrix circuit, and generates a luminance signal Y and a chroma signal $C_{r/b}$ in accordance with the entered R, G and B signals, and sends these signals to a memory control circuit 154.

The memory control circuit 154 controls the transmission of the luminance signal Y and the chroma signal $C_{r/b}$ from the memory control circuit to the CCD buffer M1, and also controls the transmission of the luminance signal Y and the chroma signal $C_{r/b}$ from the CCD buffer M1 to the display buffer M2. A detailed explanation will be given of the controlling of the reading/writing in the CCD buffer M1 and the display buffer M2.

The luminance signal Y and the chroma signal $C_{r/b}$, which are read out from the display buffer M2 by the memory control circuit 154, are sent to the third signal processing circuit 153. The third signal processing circuit 153 generates a color composite video signal of NTSC system, for example, in accordance with the entered luminance signal Y and the chroma signal $C_{r/b}$, and transmits it to a video output terminal 158 via a D/A converter 156. A synchronizing signal which has a predetermined cycle are transmitted to the memory control circuit 154, the third signal processing circuit 156 and the D/A converter 156 from a sync-generator 159. And, a timing signal which is controlled by the CPU 160 is added to the CCD circuit unit 140, the A/D converter 150, the first signal processing circuit 151, the second signal processing circuit 152, and the memory control circuit 154 from a timing signal generator 162 which is controlled by the CPU 160, so that each circuit can be synchronized.

The film drive mechanism 170 is connected to the spool 112 of the film cartridge 110, and comprises a film supplying part which rotates the spool 112 forward/backward, a film winding part which winds the film 114 sent out from the film supplying part, and a means which is provided in a film conveying path and which feeds the film 114 at a fixed speed through and between a capstan and a pinch roller. The film supplying part drives the spool 112 of the film cartridge 110 clockwise in FIG. 3, and feeds the film 114 from the film cartridge 110 until the forward end of the film is wound up by the film winding part.

The optical data reading device 180 includes a first optical sensor 180A, which optically detects a perforation 114A on the film 114, and a second optical sensor 180B which optically detects the optical data such as a bar code, etc., which are written at the edge of the film, and processes the optical data which is detected by the optical sensors 180A and 180B and transmits them to the CPU 160.

The magnetic data regenerating device 182 has the magnetic head 182A, and reads the magnetic data, which is recorded in a magnetic track 114C of the film 114, by means of the magnetic head 182A. And, the device 182 processes the magnetic data to send them to the CPU 160 and stores them in a RAM 160A. Then, it reads out the data stored in the RAM 160A of the CPU 160, converts them into appropriate signals for a magnetic recording to transmit them to the magnetic head 182A so as to record them in the magnetic record layer 114B of the film 114.

Figure 5:
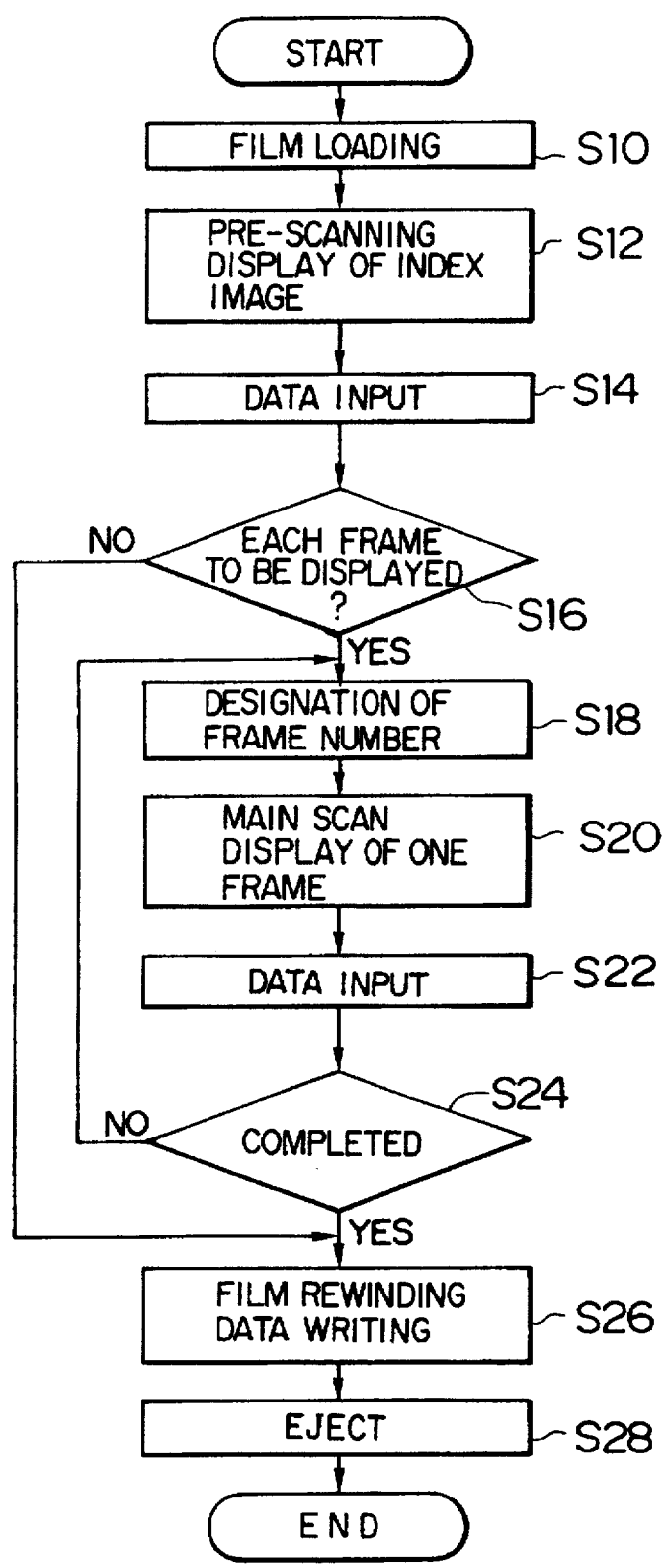
FIG. 5 is a flow chart for explaining the operation of a film player of FIG. 2.

Next, an explanation will be given of the operation of the film player 100 which is constructed in the above-mentioned manner with reference to a flow chart in FIG. 5.

The film player 100 has a function of ordering to the laboratory in addition to that of automatically regenerating the film image on the TV monitor 109. These functions are appropriately selected.

First, when the film cartridge 110 is set in the film cartridge tray 102, the CPU 160 carries out the film-loading by controlling the film drive mechanism 170 (Step S10). That is, the film 114 is sent out from the film cartridge 110, and the forward end of the film is wound around a winding axis of the film winding part.

When the film-loading is completed, the first pre-scanning of the film 114 is carried out. That is, as shown in FIG. 5, the film 114 is fed in the forward direction at a high speed of 148.0 mm/s, and then rewound in the backward direction at a high speed of 148.0 mm/s. When the above-mentioned first pre-scanning is performed, the image data is picked up by the CCD line sensor 142, and the optical data and the magnetic data are read out by the optical data reading device 180 and the magnetic record and regeneration device 182.

Next, an explanation will be given of the processing in accordance with the image data which is picked up when the above-mentioned first pre-scanning is carried out.

The dot-sequential R, G and B signals are sent from the A/D converter 150 which is shown in FIG. 3 to the CPU 160. The CPU 160 receives the signals R, G and B of all frames respectively, and calculates offset quantity and gain adjustment quantity to adjust the white-balance for respective R, G and B signals. Then, it stores offset data, which indicates the offset quantity and AWB data, which indicates the gain adjustment quantity for each frame, in a random access memory (RAM) 160A provided in the CPU. And, the CPU 160 stores AE data indicating the brightness of each frame, which R, G and B signals have in the RAM 160A. The CPU 160 detects each frame on the film 114 in accordance with the optical data and/or magnetic data which is added by an optical data reading device 180 and the magnetic record regeneration device 182. And, it also detects frame numbers by counting each frame.

Next, the second pre-scanning of the film 114 is performed. That is, as shown in FIG. 5, the film 114 is fed again in the forward direction at a high speed of 74.0 mm/s, and then it is rewound in the backward direction at a high speed of 148.0 mm/s. When the second pre-scanning is performed in the forward direction, the image data is picked up by the CCD line sensor 142. When the image data is picked up, the CPU 160 controls an aperture 134 in each frame with an aperture control device 164 in accordance with the AE data which is stored in the RAM 160A.

The CPU 160 makes the first signal processing circuit 151 adjust the offset quantity and the white balance of the signals R, G and B for each frame. That is, the CPU 160 sends the offset data of the respective R, G and B signals in each frame to the first signal processing circuit 151, which adjusts the offset quantity of the dot sequential signals R, G and B in accordance with the offset data. Similarly, the CPU 160 sends the AWB data of respective R, G and B signals in each frame, which is stored in the RAM 160A, to the first signal processing circuit 151. The circuit 151 adjusts the gain of the dot-sequential signals R, G and B in accordance with the AWB data.

The image data in each frame is adjusted according to the AE data, the AWB data, etc., so that the high-quality image data can be picked up regardless of photographing conditions in each frame.

The adjusted image data in each frame, that is, the luminance signal Y and the chroma signal $C_{r/b}$ which are transmitted from the second signal processing circuit 152 are sequentially stored in the CCD buffer M1 by the memory control circuit 154. As described above, the film 114 is fed at a speed which is eight times as fast as the feed speed in the case when the normal film image is picked up, the number of picture elements in the same direction as the film feed direction of one frame is 112 as shown in FIG. 7(A). The CCD line sensor 142 has a sensor of 1024 picture elements in the direction perpendicular to the film feed direction as mentioned previously. In this case, the picture elements are thinned out to be 1/16 of 1024 picture elements, therefore, the number of picture elements in the direction perpendicular to the film feed direction of one frame is 64. And, the CCD buffer M1 has a storage capacity for storing the data of 512×1024 picture elements as shown in FIG. 7(A), so it can store the image data of 5×4×2(=40) frames. That is, the image data (the index image data) showing the index image of 40 frames are stored in the CCD buffer memory.

The display buffer M2 has a capacity for storing the data of 512×1024 picture elements as shown in FIG. 7(B). When storing the index image data, it stores the image data of 5×4×2(=40) frames in a state that the picture elements of each frame is thinned out to be 73×128. And, when the index image is displayed on the TV monitor 108, the region of 480×640 picture elements at the upper left of the display buffer M2 is read out (refer to FIGS. 7(B) and 7(C)).

Because the display buffer M2 can store the image data for only twenty frames at a time, it displays the index image of 40 frames by scrolling the index image or switching screens.

The CPU 160 displays the index image, in which frame numbers are superimposed, by designating each frame to be No. 1, No. 2 ... according to the order that the image data in each frame are read out at the time of the scanning and sending a character signal which indicates a frame number of each frame (Step S12).

When the index image is produced as described above and the index image is displayed on the TV monitor 109, the user enters various types of information (hereinafter referred to as automatic regeneration information) which is required for displaying a desired film image on the TV monitor 109, or information concerning an order to the laboratory (Step S14).

In the film player 100, a function selection means, which is not shown in the drawing, selects an automatic regeneration function, an at-home printing function, a function of the order to the laboratory. Automatic regeneration information which is entered when the automatic regeneration is selected is as follows:

<Information relating to raising an effect of automatic regeneration>

Information relating the length and breadth of a frame: information relating to having a regenerated image correctly positioned on a monitor and information relating to instructing the up-down and right-left of the image.

Character information: information concerning the character for each frame and a film as a whole.

Time/date information: information relating to the date and time of photographing for each frame.

Regenerated image information: information relating to designating a range which is to be regenerated on the monitor.

Color Correction Information: information which is set manually for designating luminance, color, color density, contrast and sharpness of each frame.

Special monitor effect information: information relating to an automatic color correction according to the contents of each frame screen (sunset effect, night view effect and the like).

Close-up information: information relating to magnification/a central position for enlargement.

Automatic zooming information: information relating to magnification at the start of zooming, magnification at the end of zooming, and zooming time.

Screen switch information: information for designating a method of switching screens frame to frame, which indicates immediate switching, scroll in/out, fade in/out, overlapping, wipe in/out, and time of these switching (a second is a unit).

Screen movement information: information concerning the scanning within a screen of a frame (information relating to panning and tilting) and information relating to time for above-mentioned movement.

Display time information: information relating to the displaying time of each frame (a second is a unit).

Sound information at the time of regeneration: instruction as to what kind of music is played at the time of automatic regeneration (instruction for each frame or a film strip as a whole).

Character display information: information relating to display/non-display of a title, the date and time and the like, and a display color and a display position.

<Other information>

Automatic color correction information: information which is automatically set at the time of pre-scanning, relating to the previously-mentioned AE and ALB data.

<Information relating to the control of automatic regeneration>

Start frame information: information concerning a start frame number at the time of automatic display.

End frame information: information concerning a frame number of an end frame at the time of automatic display.

Next frame information: information relating to a frame number of a frame to be displayed after the displayed frame.

Non-regenerated frame information: information relating to instructing a frame number which is not regenerated at the time of automatic display, or information which is provided for each frame, relating to whether a frame is regenerated or not.

Each piece of the above-described information is entered by an [EXECUTE] key 120A and a [CANCEL] key 120B (refer to FIG. 3) of a mouse 120, and by instructing a position of an arrow with a roll.

Figure 8:
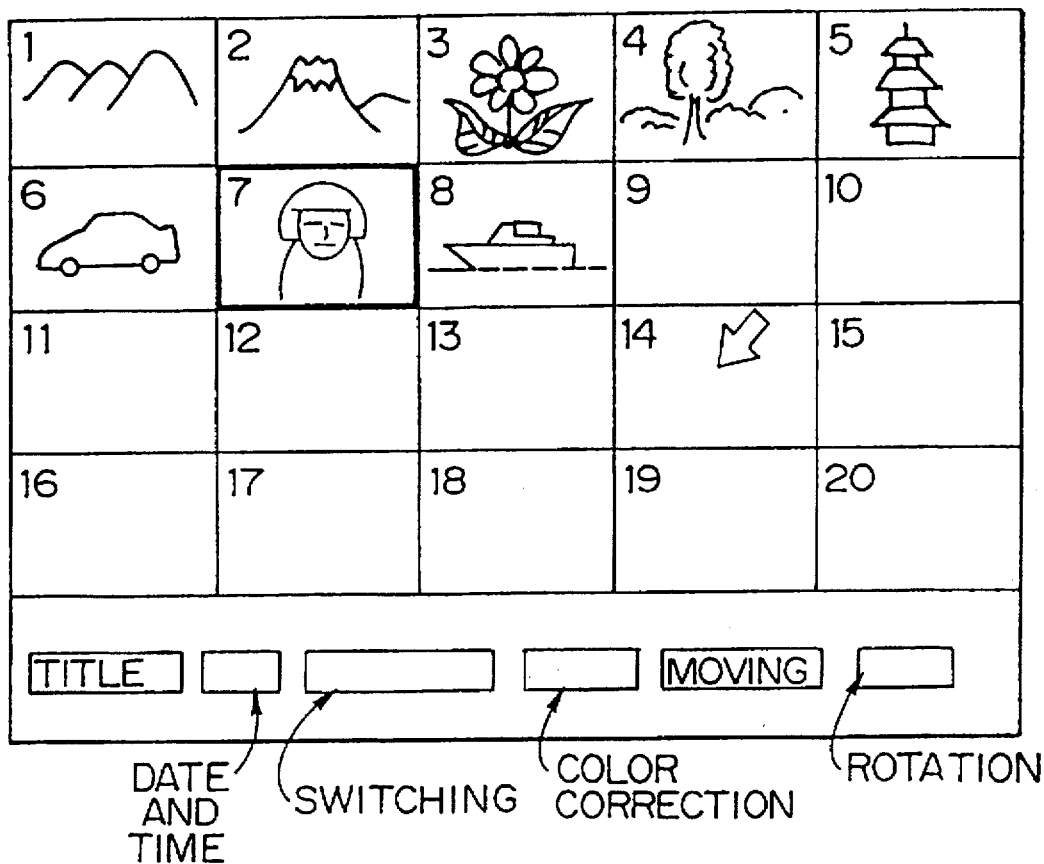
FIG. 8 is a view illustrating one example of a monitor screen in the case when information relating to automatic regeneration is input by use of an index image.

That is, as shown in FIG. 8, when the automatic regeneration function is selected, the CPU 160 displays the index image showing 20 frames, characters which indicate various ways of setting a menu or an icon at the lower side on a monitor screen. A frame to be edited on the index screen is selected by moving the arrow to the frame to be edited with the mouse 120 and then clicking the [EXECUTE] key 120A. On the selected frame, a black frame which is darker than other frames is displayed as shown in the seventh frame in FIG. 8.

After that, the arrow is moved to characters or an icon which indicates an optional setting menu, and the [EXECUTE] key 120A is operated, so that the setting menu can be selected.

For example, when the information concerning the regeneration order of each frames is entered, the menu to set the regeneration order is selected with the mouse 120. Then, the arrow is moved to a frame corresponding to the regeneration order with the mouse 120, and the [EXECUTE] key 120A is clicked. By repeating this operation, the regeneration order for a plurality of frames can be entered. By displaying a number, which indicates the regeneration order, in each frame of the index image every time the regeneration order is instructed, an overlap instruction can be avoided. And, the information relating to the frame numbers of frames which are instructed to be regenerated first and last corresponds to the previously-mentioned numbers of the regeneration start frame information and the regeneration end frame information respectively, and information relating to frame numbers of frames which are not designated corresponds to non-regeneration frame information. Similarly, each piece of the above-described information can be entered with the mouse 120 by interactive processing on screen. After the entry of the information is over, it is selected whether or not one frame is displayed on the monitor (Step S16). When it is determined that one frame is displayed on the monitor, it is possible to enter the same information while looking at the frame image.

That is, a frame number is set (Step S18), and then the film 114 is fed in the forward direction at a speed of 9.25 mm/s by one frame, so that the frame of the set frame number is scanned (main-scanning) (Step S20). When the main-scanning is performed, the image data is picked up by the CCD buffer M1 via the CCD line sensor 142.

When the image data is picked up, the CPU 160 adjusts the image data of each frame according to AE data, AWB data and the like which are stored in the RAM 160A, so the high-quality image data can be picked up regardless of the photographing conditions of each frame. The number of picture elements in each frame, which is transmitted to the CCD buffer M1, is 512×896 as shown in FIG. 7(D). That is, the CCD output of the CCD line sensor 142 having a sensor of 1024 picture elements is thinned out to be half, so that the number of picture elements in the direction perpendicular to that in which the film is fed by one frame. The film feed speed is set to be ⅛ compared to that in the case when the image data of the index image are picked up, so that the number of picture elements of one frame is 896, which is eight times as large as that of picture elements (112) in the same direction as the film feed direction of one frame of the index image.

Figure 9A:
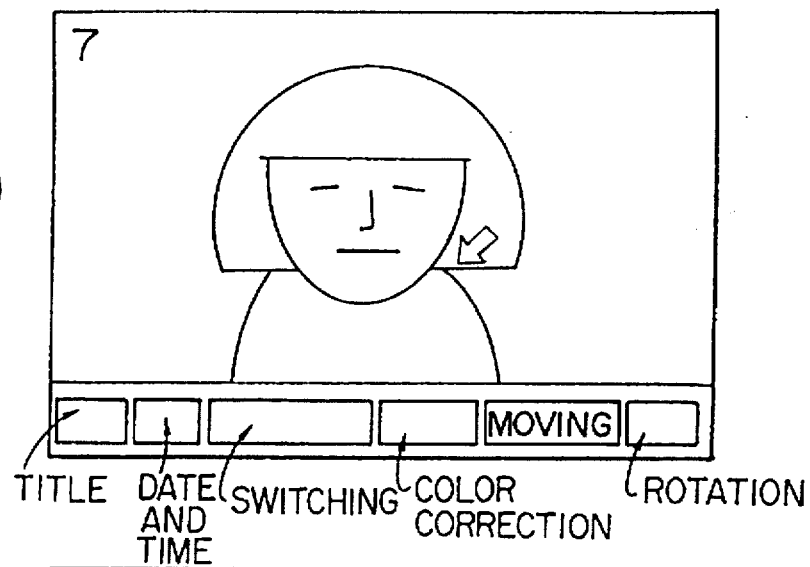
FIGS. 9(A), 9(B) and 9(C) are views illustrating one example of a monitor screen in the case when information relating to automatic regeneration is input by use of one frame image.

The image data in one frame, which is transmitted to the CCD buffer M1 in the above-mentioned way, is transferred to the display buffer M2, and the data in the display buffer M2 is read out so that the image data in one frame can be displayed on the monitor TV 106. A frame number ("7" is indicated in the drawing) is displayed at the upper left of the monitor screen as shown in FIG. 9(A), and a character or an icon which indicates various types of the setting menu is displayed at the lower part of the monitor screen.

The above-mentioned menu is selected with the mouse 120, just like when the information is entered by use of the index image.

Figure 9B:
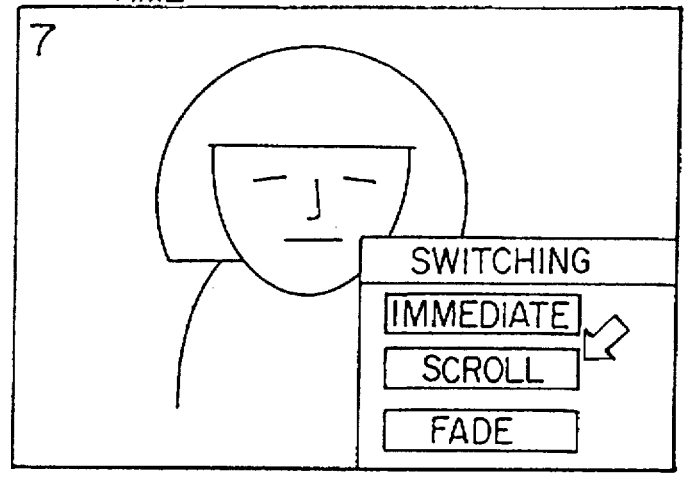

When the arrow is moved to characters or an icon, which indicates "screen switching", and the [EXECUTE] key 120A is clicked, the menu is changed to a screen-switching setting menu. And, a parameter in each item of the screen-switching setting menu is displayed at the lower left of the screen (FIG. 9(B)). In this case, the previous setting parameter blinks. Here, when the mouse 120 is moved so that the arrow moves to the desired parameter and the [EXECUTE] key 120A is clicked again, the selected parameter starts blinking. And, when the [EXECUTE] key 120A is clicked again, the parameter is set and the setting screen of the item disappears.

Next, an explanation will be given of the case when information relating to characters are entered by use of a key board which is not shown in the drawing.

Figure 9C:
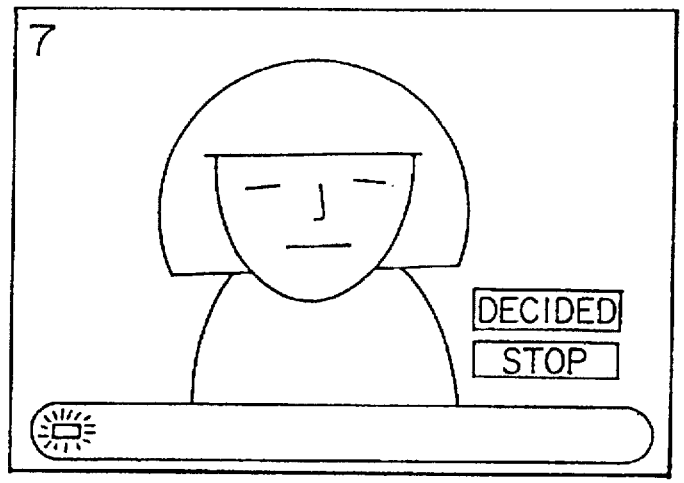

In this case, the arrow is first moved with the mouse 120, so that characters "title" or an icon on the setting screen is selected, and the [EXECUTE] key 120A is clicked. As a result, the title setting menu appears on the screen, and a rectangular white column (left corner of which blinks) is displayed at the lower part of the monitor screen, and the characters [DECIDED] and [STOP] are displayed at the right of the white column as shown in FIG. 9(C).

Next, when the key board (not shown in the drawing) which is connected to the film player 100 is operated, titles are entered from the left corner toward the right side. The blinking position moves toward the right side. In the case that a correction is necessary during the entry of characters, the [CANCEL] key 120B is clicked. As a result, characters of the title in the blinking part at the right side disappears one by one. When the entry is over, the arrow is moved to [DECIDED] by use of the mouse 120, and the key 120A is clicked. As a result, the title setting is completed, and the white column and the characters [DECIDED] and [STOP] disappear. In the case when the title entry is stopped, the arrow is moved to [STOP] disappear. In the case when the title entry is stopped, the arrow is moved to [STOP] by use of the mouse 120, and the [EXECUTE] key 120A is clicked. As a result, the title information disappears, and the title before setting remains.

In the above-mentioned way, various types of information can be entered by use of the mouse 120 by the interactive processing on screen. When the entry of the above-mentioned information is over (Step S24), or when the frame display is not selected in the step S16, the film 114 is fed in the forward direction at a high speed of 148.0 mm/s. During the feeding, magnetic data stored in RAM 160A of CPU 160 is recorded in the magnetic track 114C on the film 114 (Step S26). After the completion of recording magnetic data, the film 114 is rewound in the backward direction at a high speed of 148.0 mm/s, and then the film cartridge 110 is taken out (STEP S28).

Next, an explanation will be given of the method of recording magnetic data in the magnetic track 114C.

Figure 10A:
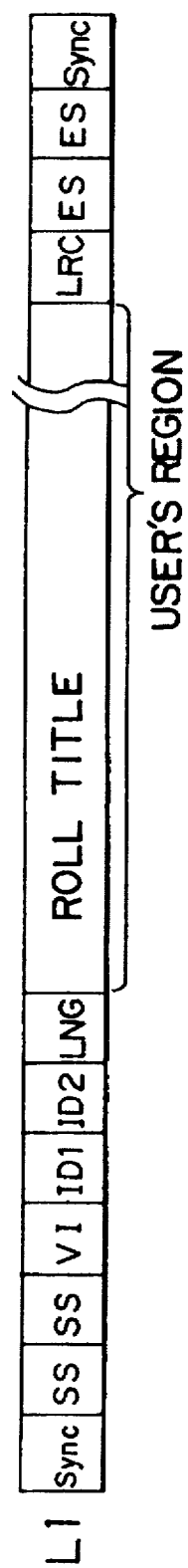
FIGS. 10(A) and 10(B) are views illustrating a record format of a leader track.
Figure 10B:
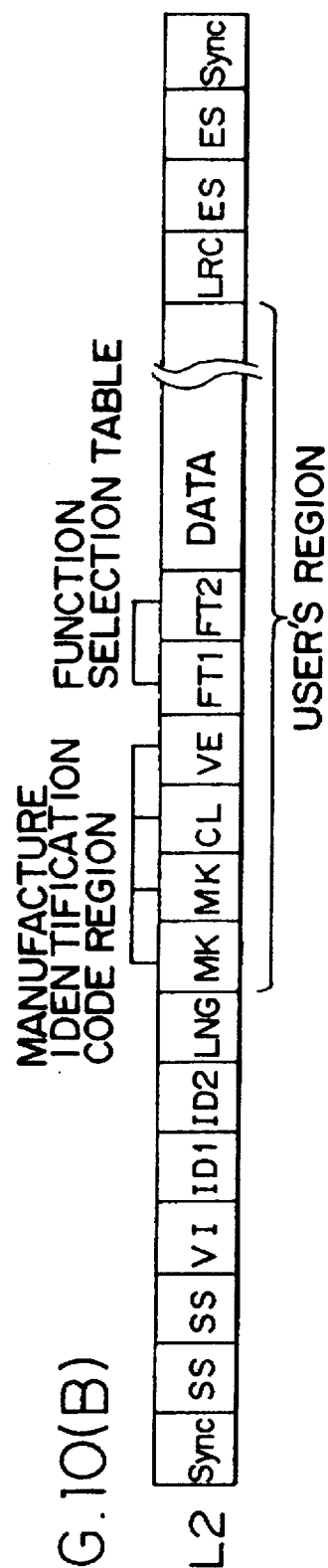

FIG. 10 shows a record format for leader tracks L1 and L2 in the leader part in the magnetic track 114C of FIG. 3 for users.

As shown in FIG. 10, Sync is a synchronizing signal, SS is a start signal, VI is data indicating a version of the recording method, ID1 and ID2 are data which determines types of a data field and types of information included in the data field, LNG is data which determines the data length of the whole data field, LRC is data which is used for error-checking and correction in the whole data field, and ES is a region in which data indicating an end signal is stored. A user's region is provided between the region LNG and the region LRC.

In the user's region in the leader track L1, a title of a roll of film, for example, is recorded. In the user region in the leader track L2, a manufacturer identification code region of 4 bytes and function selection tables of 2 bytes FT1 and FT2 are provided at its head, and regions for recording other data are provided behind them.

In the manufacturer identification code region, a manufacturer code MK of 2 bytes, which is peculiar to a manufacturer, is recorded, and a classification code CL and a version management code VE of one byte are respectively recorded in the next boxes. The classification code CL is the data indicating the classification pedicular to a manufacturer (for example, a number of an apparatus), and the version management code VE is the data which indicates what is included in the service. That is, when a virgin film (a film which is not magnetically recorded in the leader track and the like) is set, or when there is an order from the user, the film player 100 automatically records the manufacturer code MK, the classification code CL and the version management code VE which are previously set in the manufacturer identification code region.

The magnetic identification code is read by a film player, other machines and the like. As a result, a machine, a laboratory and users can recognize the manufacturer and requested/provided service. That is, they can determine whether they can cope with the magnetic information or not, from the readout manufacturer identification code. If they cannot, a warning is made in the machine, the service is provided in another laboratory which can cope with the magnetic information, or the film is return to the user with the notice saying they can not provide the service, so that the provision of an incorrect service can be prevented.

The function selection code, which indicates desired service (one service among automatic regeneration, printing at home, order for the laboratory and the like) selected by the user, is recorded in the function selection tables FT1 and FT2 of two bytes next to the manufacture identification code region. The data, which corresponds to the service recorded in the function selection tables FT1 and FT2, is only recorded in each frame track. As a result, satisfactory service can be provided although the storage capacity for magnetic recording in the frame track is limited.

Moreover, the function selection is divided into a rough classification and a detailed classification which subdivides the rough classification. The function selection code, which represent the rough classification and the detailed classification respectively, are recorded in the function selection tables FT1 and FT2. For example, when a TV slide show is selected in the rough classification, one of full-automatic regeneration (automatic regeneration according to the instruction of the apparatus when the film is inserted) and automatic regeneration (regeneration according to the instruction of the user) is selected in the detailed classification, and what is recorded in the frame track is changed. As a result, the satisfactory service can be provided.

On the other hand, in the film player 100, the print order information, which is input when the function of ordering to the laboratory is selected, is as follows:

<What is recorded in the leader track>

Roll title information: information concerning the title of the whole film.

Roll title printing information: information as to whether or there are characters to be printed, a color of a character to be printed, a position of a character (surface, back, etc.), the designation with regard to the form of a character (outline type, half, background processing omitted, etc.)

Special print order information: information concerning an index print, whether there is a post card to be printed, the number of prints, etc.

Surface information: information relating to the designation of silk surface, gloss, etc.

Print size information: information as to the designation of a paper size.

Information concerning the number of prints ordered: information relating to the total number of prints, the number of prints in each size, the number of prints to be closed-up, the number of prints to be provided with a title, date, etc.

Ordered frame information: information concerning an instruction of a frame to be reprinted (for example, 1–40 frames).

<What is recorded in the frame track>

Information as to the number of reprints: information concerning the number of extra prints for each frame.

Frame title information: information relating to a title of each frame.

Frame title character information: information relating to whether there is character to be printed or not, a color of a character to be printed, a position of a character to be printed, the form of a character, etc.

Information as to printing of the date and time of photographing: information relating to the date of photographing.

Close-up information: information relating to a magnification and a central position.

Print format information: information relating to the designation of each format, normal, hi-vision, and panoramic.

Up-down and right-left information: information relating to the up-down and right-left at the time of printing (the direction in which a title and the date and time are printed).

Color correction information: information concerning the designation of color correction from the user at the time of reprinting (red-tinged, dark . . . ).

The above-described information can be entered in the same way as when the automatic regeneration is performed. In the case that a different function is selected at the time of selecting a function to be saved as a new piece of magnetic information, the previous magnetic information is deleted.

For example, the function of automatic regeneration is selected and the automatic regeneration information is saved. If order information for a laboratory is recorded in the same film, the order information is written over the automatic regeneration information. As a result, the automatic regeneration information is deleted.

Therefore, in this case, the external storage means such as a flash memory is provided in the apparatus, so that the automatic regeneration information can be kept. And, it is possible to perform the automatic regeneration again for the film returned from the laboratory by reading out the automatic regeneration information from the external storage means. The automatic regeneration information can be written on the film as the magnetic information if the user hopes so.

When the user takes the film cartridge 110, in which the above-mentioned print order information is recorded, to the development agency, the film cartridge 110 is set in an automatic accepting equipment 200. The automatic accepting equipment 200 reads the print order information from the film cartridge 110 and automatically makes an order certificate.

Figure 6:
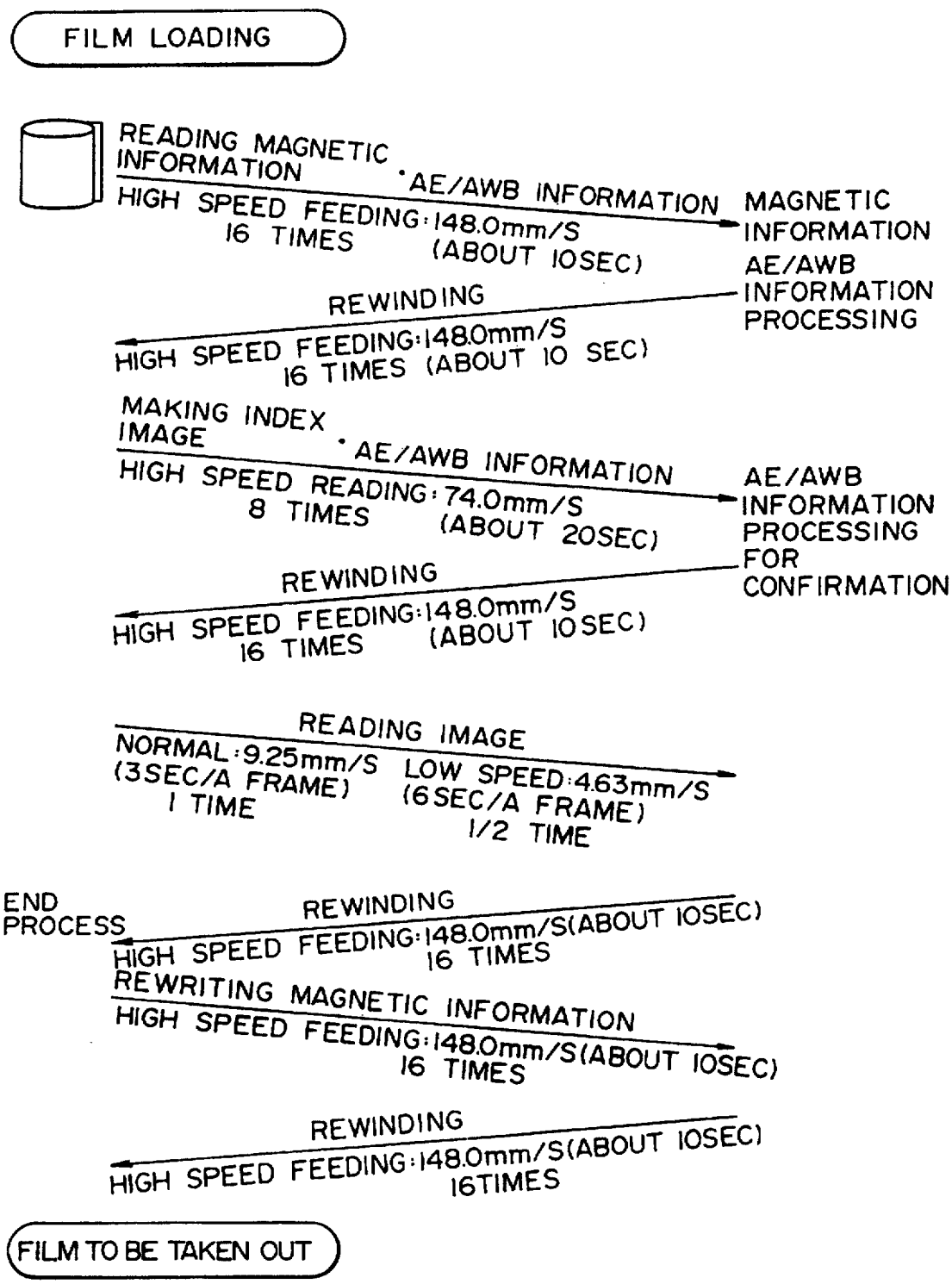
FIG. 6 is a view illustrating one example of a conveyance sequence of a film which is conveyed in a film player of FIG. 2.

A piece of information which is necessary for making the order certificate is recorded in the leader tracks L1 and L2 on the film 114. Accordingly, the automatic accepting equipment 200 only reads the information recorded in the leader tracks L1 and L2 so as to make the order certificate. As a result, the order certificate can be quickly made in comparison with the case when it is made by reading all the magnetic information on the film 114. When all the magnetic information on the film is read and rewound, it takes about 20 seconds even if a speed, at which the automatic accepting equipment 200 reads and rewinds the magnetic information, is set at a high speed of 148.00 mm/s (refer to FIG. 6).

Furthermore, because a piece of information, which is necessary to calculate a fee for taking additional copies, is included in the leader tracks L1 and L2, the fee can also be printed on the order certificate.

FIGS. 11 and 12 are views illustrating one example of the order certificate made by the automatic accepting equipment 200. The order certificate in FIG. 11 shows a detailed order information for each frame for additional copies, whereas the certificate in FIG. 12 shows at least a piece of information which is necessary to calculate a fee for taking additional copies, but not showing the order information for each frame.

In the above-mentioned embodiment, the explanation was given of the case when the print order is placed by use of only the magnetic information which is recorded on the film 114 in the film cartridge 110. Next, an explanation will be given of a processing when the print order is placed by both the magnetic information and the order sheet.

Figure 13:
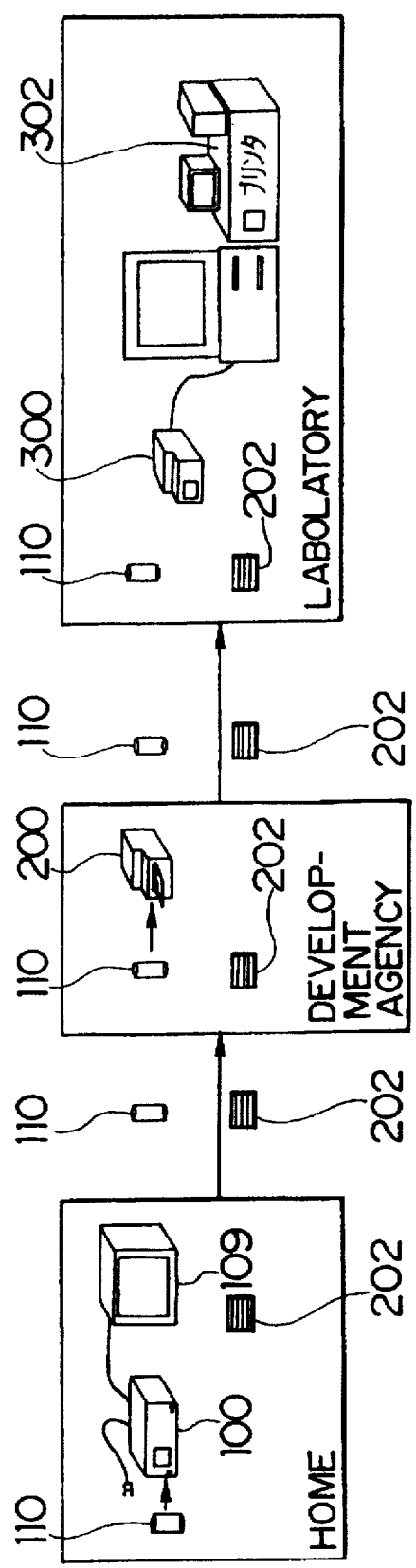
FIG. 13 is a view illustrating an entire system in which the print order is placed by means of both magnetic information in a roll of photographic film and an order sheet.

FIG. 13 is a view illustrating an entire system in which the print order is placed by means of both magnetic information in a roll of photographic film and an order sheet. The same marks are put on the parts common to FIG. 1, and a detailed explanation of those is omitted here.

As shown in FIG. 13, at home, the print order information such as the close-up information, which is difficult to designate with the order sheet 202, is recorded in the magnetic track on the film in the film cartridge 110 by means of the film player 100.

Figure 14:
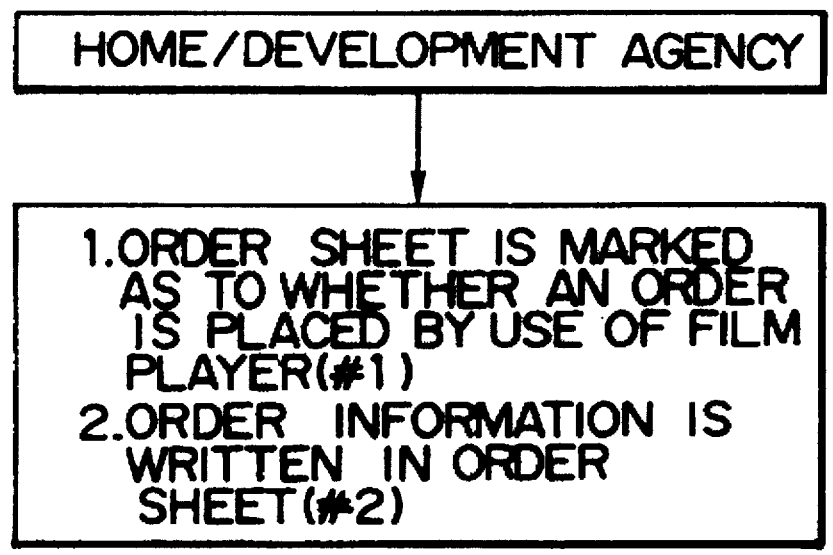
FIG. 14 is a view illustrating what is written on an order sheet at home or development agency.

As shown in FIG. 14, at home or the development agency, the order sheet 202 is marked as to whether or not the order is placed by making use of the film player 100 (#1), and ordered frames and the number of prints are written on the order sheet 202 (#2). When the information #1 and #2 are inputted into the automatic accepting equipment 200 at the development agency, the order certificate can be made. The film cartridge 110 and the order sheet 202 are delivered to the laboratory.

Figure 15:
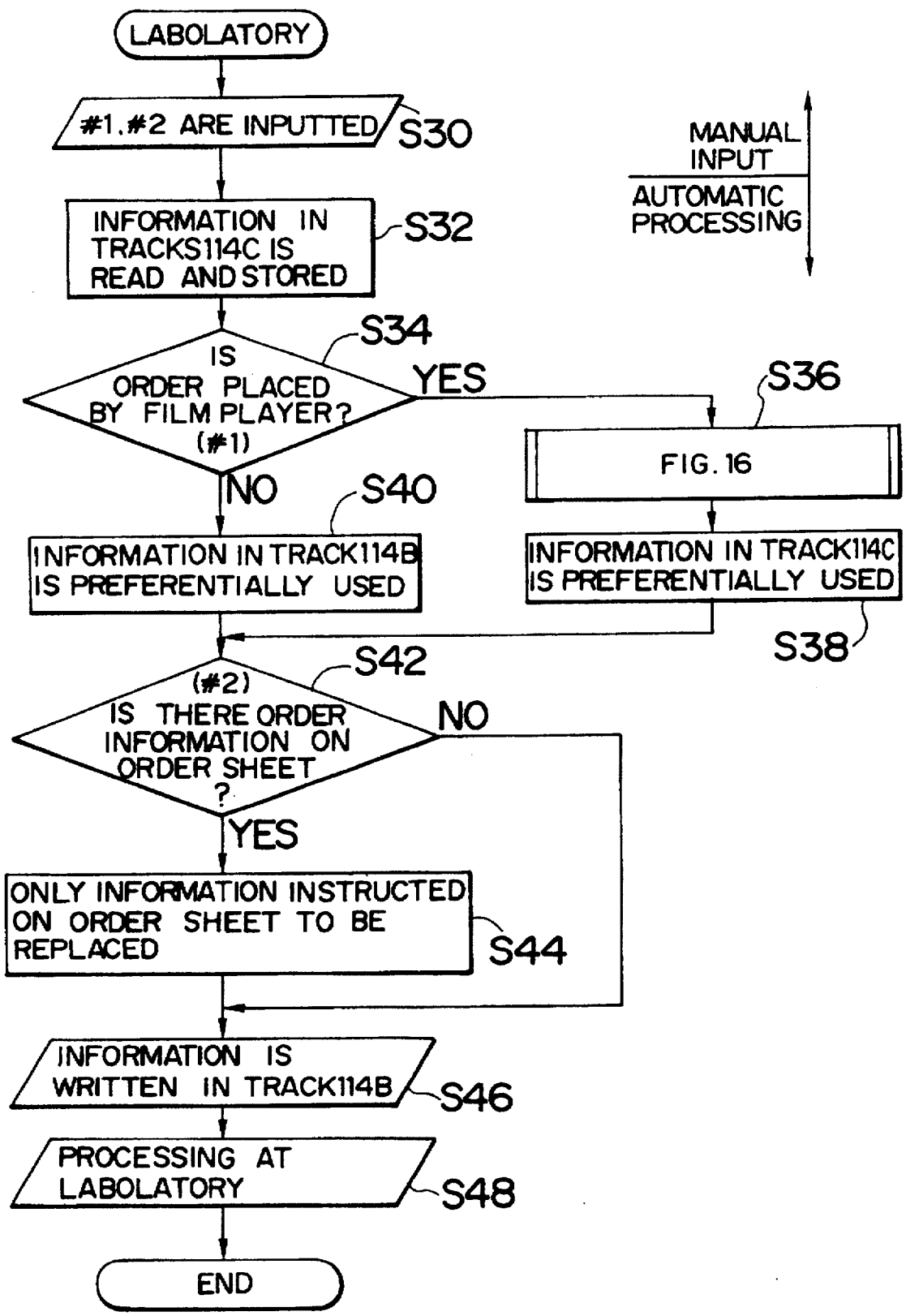
FIG. 15 is a flow chart illustrating one embodiment of a processing procedure at a laboratory.

As shown in FIG. 15, the information #1 and #2 which are written on the order sheet 202 are inputted at the laboratory (Step S30), and the information in the leader tracks for the user is read and stored (Step S32). Next, it is judged from the information #1, which is inputted in the step S30, whether or not the order has been placed by use of the film player 100 (Step S34). When the order has been placed by use of the film player 100, a subroutine of S36 is carried out as shown in FIG. 16.

Figure 16:
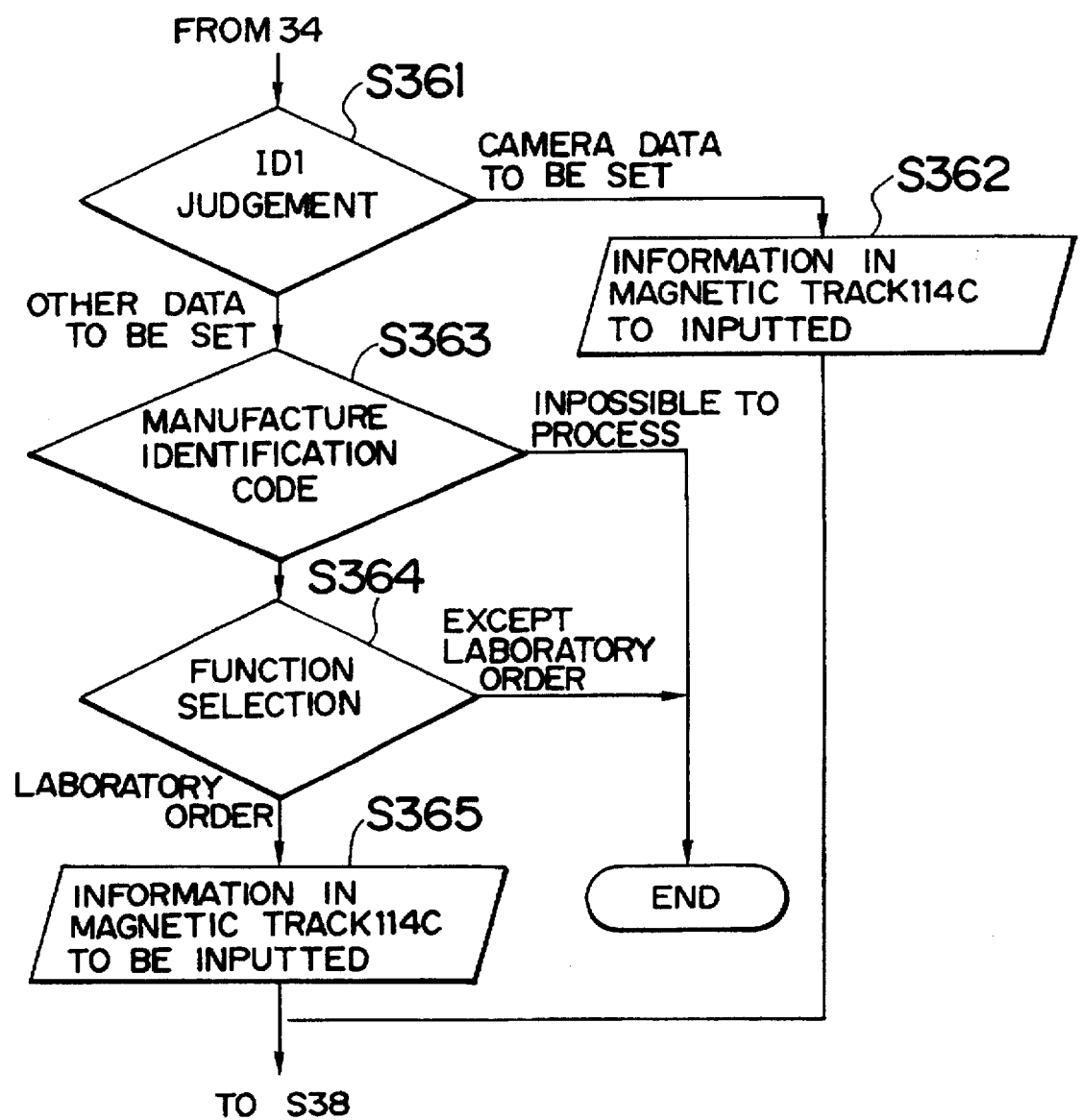
FIG. 16 is a flow chart illustrating a detail of Step S36 in FIG. 15.

That is, as shown in FIG. 16, it is judged from the data ID1 (refer to FIG. 10) among the information being stored in the step S32 whether the information in the magnetic track 14C is provided by the camera or by the other apparatus such as the film player, etc. (step S361). In the case that the information was provided by the camera, the information which is provided by the camera in the magnetic track 114C for the user, is immediately inputted (step S362).

On the other hand, in the case that the information was provided by the other apparatus such as the film player, etc., it is judged from the manufacturer identification code (a manufacture code MK, etc.), which was stored in the step S32, whether or not the print order can be placed in accordance with the magnetic information (Step S363). That is, when it is judged that the information is provided by an apparatus not having the function of ordering to the laboratory, it is predetermined that incorrect laboratory service is not provided. When it is judged that the information was provided by an apparatus which has the function of ordering to the laboratory, it is further judged as to whether the function of ordering to the laboratory is selected by means of the function selection tables FT1 and FT2 (Step S354). When the function of ordering to the laboratory is not selected, the information in each frame track is not the order information, so the laboratory service is not provided. On the other hand, when the function of ordering to the laboratory is selected, the information in the magnetic track 114C for the user is inputted (Step S365).

Then, as shown in FIG. 15, when the order is placed by making use of the film player, the information in the magnetic track 114C, which was read out in the above-mentioned steps S362 and S365, is preferentially used (Step S38). When the order is placed without use of the film player, the information in the magnetic track 114B for the laboratory is preferentially used (Step S40).

Next, it is judged from the information #2 inputted in the step S30 whether there is information as to the order on the order sheet 202 (Step S42). When there is the print order information on the order sheet 202, the information on the order sheet 202 is preferentially used. That is, as for the information in the magnetic track 114B or 114C, which is preferentially used in Steps S38 or S40, a corresponding item to the order sheet is replaced by the information on the order sheet 202 (step S44). After this, the changed information is copied in the magnetic track 114B which is used for the laboratory. When there is no information on the order sheet 202, the preferentially used information in the magnetic track 114B or 114C is copied in the magnetic track 114B as it is (Step S46).

Then, additional copies are taken in accordance with the order information recorded in the magnetic track 114B (Step S48).

In the above-mentioned embodiment, the order sheet 202 is marked, so that it can be judged whether or not the order has been placed by the film player 100. An explanation will be given of the other embodiment which does not require the marking.

Figure 17:
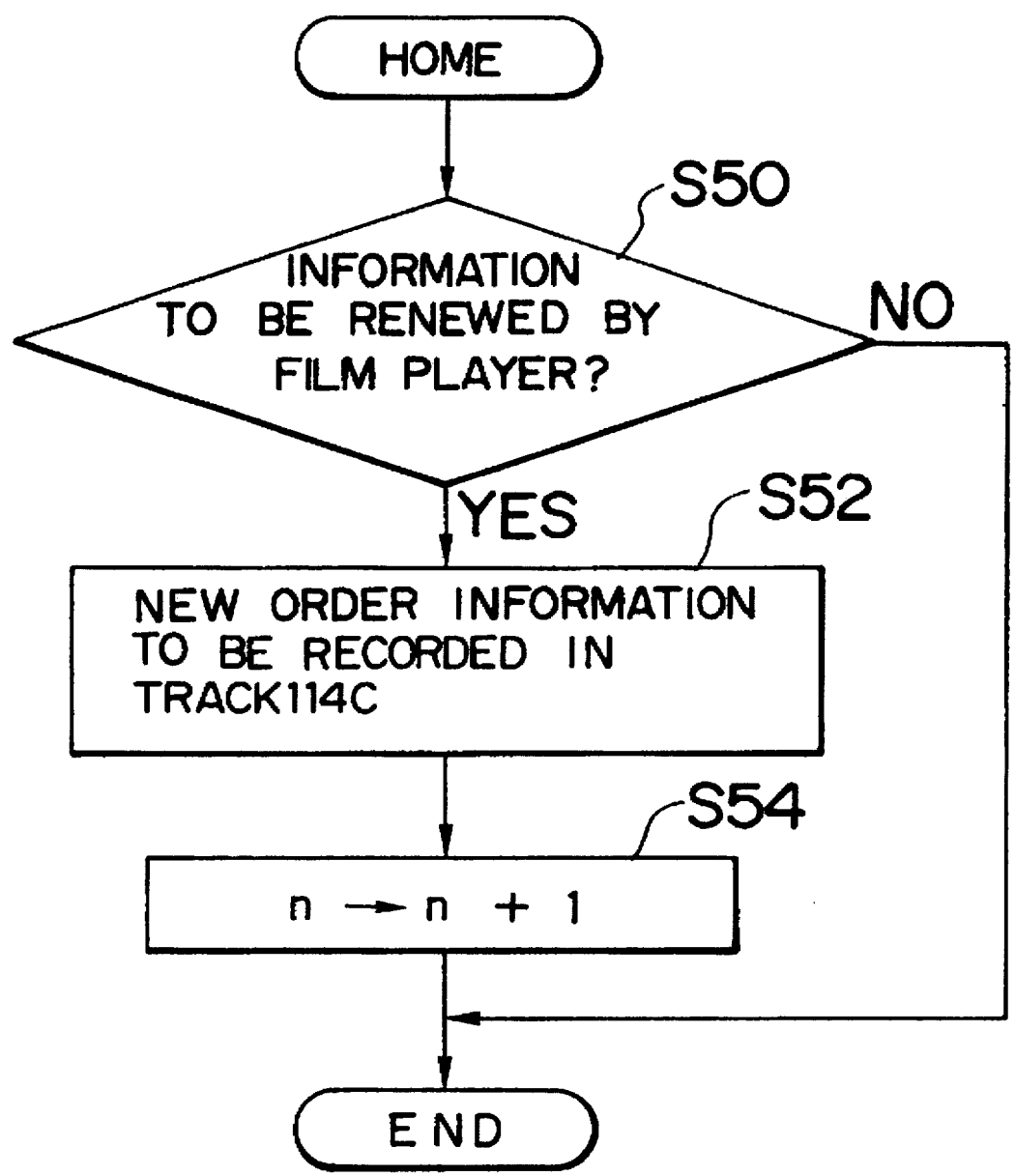
FIG. 17 is a flow chart illustrating a method of renewing a renewal code at home; and, FIG. 18 is a flow chart illustrating the other embodiment of a processing procedure at a laboratory.

In this case, a region for recording a renewal code N is provided in a leader part of each of the magnetic tracks 114B for the laboratory and 114C for the user. In the film player 100, as shown in FIG. 17, it is judged whether or not the information as to the order in the magnetic track 114C is to be renewed (step S50). When the information is to be renewed, the information as to the order in the magnetic track 114C is rewritten (step S54). At the same time, the value of the renewal code N is increased by one (1), and this renewal code is the latest renewal code. On the other hand, when the information is not to be renewed (that is, the information as to the order is the same as that of the previous printing) the renewal code N is not renewed.

Next, an explanation will be given of processing in the laboratory with reference to FIG. 18. The same marks are put on the steps common to FIG. 15, and a detailed explanation of them is omitted here.

Figure 18:
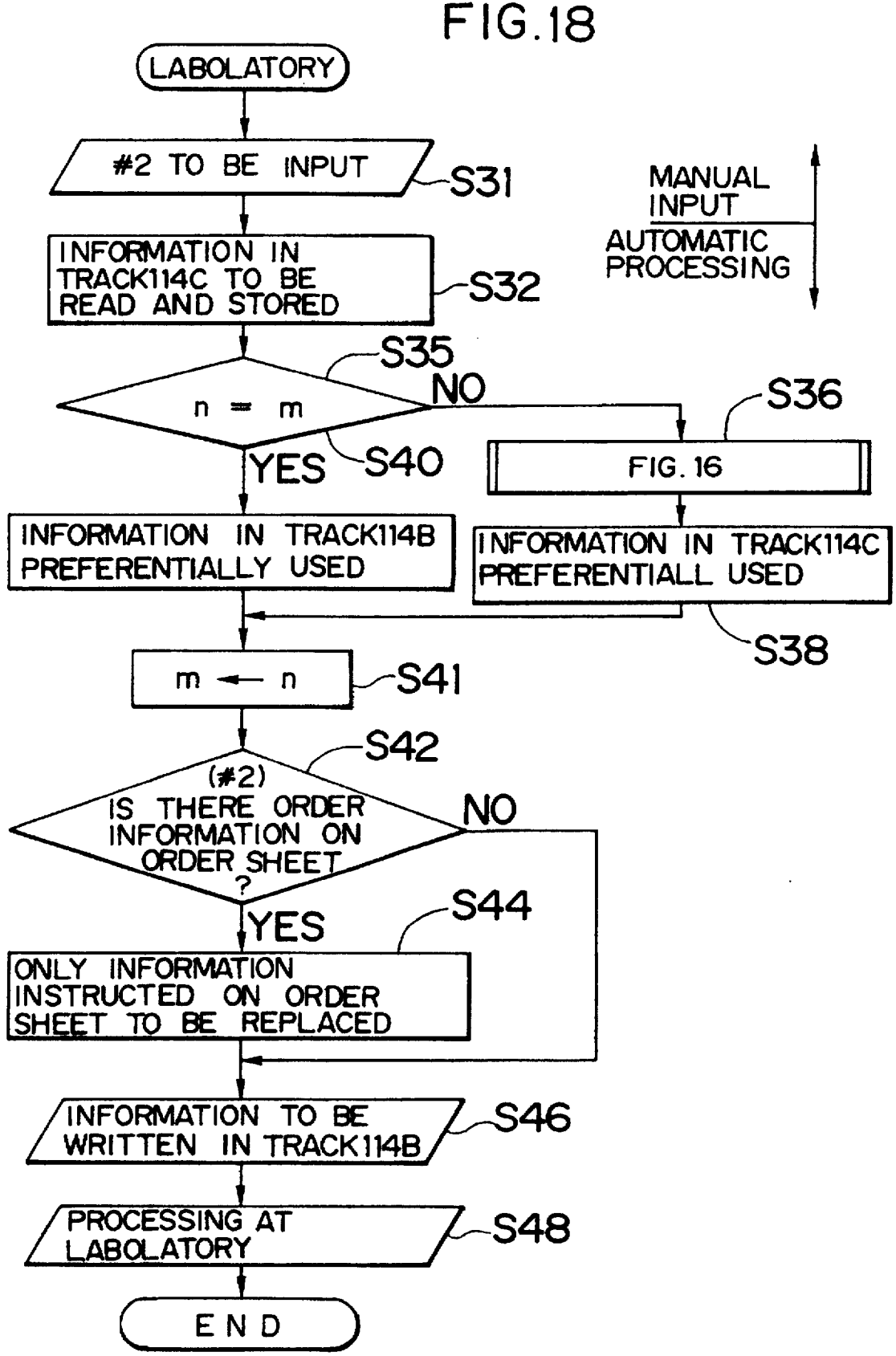

As shown in FIG. 18, processing of the steps S31 and S35 are carried out instead of the steps 30 and 34 in FIG. 15, and a step S41 is added.

In the step S31, only the order information #2 by the order sheet is inputted manually, and the information #1 is not inputted, which relates to whether the order is placed by making use of the film player 100. In the step S35, a renewal code N of the magnetic track 114C and a renewal code M of the magnetic track 114B for the laboratory are compared with each other. When both of the renewal codes M and N do not correspond to each other, it is judged that the renewal code N has been renewed (the order was made by making use of the film player 100), and the same processing as those of the steps S36 and S38 in FIG. 15 are carried out, and then the processing proceeds to a step S41.

In the step S41, the renewal code M in the magnetic track 114B for the laboratory is replaced by the newest renewal code N in the magnetic track 114C. That is, the renewal code N and the renewal code M are made to correspond to each other in the step S41. As a result, the renewal code N and the renewal code M keeps corresponding to each other unless the renewal code n is renewed as shown in the step S54 of FIG. 17 (unless a reorder is placed by making use of the film player 100). Accordingly, as mentioned above, when N does not equal to M (N≠M), the information in the magnetic track 114C is preferentially used, and when n equals to m (N=M), the information, which is recorded in the magnetic track 114B at the previous time of making additional copies in the laboratory is preferentially used.

In the above-described embodiment, when N equals to M (N=M), it is judged that the magnetic information in the magnetic track 114C has not been rewritten, and the information in the magnetic track 114B is automatically and preferentially used. However, the present invention is not limited to this. The development agency and the like ask a user if the order is the same as the previous one, and when they are the same, the information in the magnetic track 114B may be preferentially used.

In the above-described embodiment, the renewal code is applied for indicating whether or not the print order is placed by means of the film player, however, the present invention is not limited to this. It is also possible to consider another method for the same purpose. That is, a record region for recording a flag which indicates that a process for the order to be completed is provided in the leader track. When the user renews the data concerning the order which is placed by means of an apparatus, the flag is cleared by the apparatus, and in the laboratory, the flag is set. In this case, the development agency can confirm to the user whether the order is the same as the previous one, when the print reorder is placed in such a state that the flag is set.

Next, an explanation will be given of the other method of recording the magnetic data in the magnetic track 114C.

The print order information to be recorded in the magnetic track 114C is classified as follows:

(1) Information which is rewritten for every order: for example, the ordered frame designation information, the information as to the number of reprints, and so forth.
(2) Information which is not desired to be rewritten once it is inputted: for example, the close-up information, the frame title information, and so forth.
(3) Information which is desired to be added if not recorded: for example, information as to the date and time of photographing, and so forth.

If the above-mentioned classification is previously decided on between the apparatus and the laboratory, the processing can be automatically carried out at the laboratory when the order for additional copies is placed.

That is, the information (1) is automatically deleted or reset after the printing at the laboratory, and the user receives the film in which the information (1) is deleted or reset. As a result, it is possible to prevent the information (1) which is to be rewritten for each order from remaining at the time of reordering. On the other hand, the information (2) is not processed in the laboratory.

If the user requests the information (3) with the order sheet, etc., the information (3) is written in the laboratory. Therefore, when there is a request from the user with regard to the film photographed by an inexpensive camera which cannot magnetically record the information such as the date and time of photographing, the service of magnetically recording the information such as the date and time of photographing can be provided by the laboratory.

Furthermore, in this embodiment, when one function is selected among the function of automatic regeneration, the function of ordering to the laboratory, and so forth, only the magnetic information corresponding to the selected function is recorded in the magnetic track on the film. On the other hand, the magnetic information corresponding to the unselected function is stored in the other storage medium. If the magnetic information is not classified according to functions as described above, the magnetic information should be rewritten according to the purpose. As a result, a complicated processing is required.

To eliminate the above-mentioned problem, the additional bit for each piece of magnetic information is provided in the leader track or the frame track, and the flag indicating whether the print order information is valid or invalid is recorded in the additional bit in accordance with an instruction by the user. That is, the user gives an instruction as to whether the magnetic information is used as the print order information, and it is predetermined between the apparatus and the user that the magnetic information in which the invalid flag is recorded in the additional bit thereof is not accepted as the print order information. As a result, even though the magnetic information other than the actual print information still remains, it is possible to prevent the magnetic information from being processed.

Accordingly, for example, as for the information which is commonly used for the automatic regeneration function and the print order function, when it is used for the automatic regeneration but not used for the print order (for example, when a close-up information is used for TV slide show but not used for the print order), the information can remain at the time of the print order. Especially, this method is effective in the case when the information (2) is to remain, for example, it is not required to input the close-up information, etc. once more at the time of automatically regenerating the film.

As has been described above, according to the method of accepting a print order, it can be automatically judged by means of the renewal code and the flag indicating that the order processing is completed if the order recorded in the magnetic track is the same as the previous one. As a result, it can be confirmed to the user at the development agency, etc. if the order is the same as the previous one, and the processing at the laboratory can be automated. Moreover, according to the present invention, even if the order by the magnetic information recorded in the magnetic track on the film and the order by the order sheet are intermingled with each other, the processing at the development agency and the laboratory can be routinized. Furthermore, according to the present invention, the print order information is classified into plural types of information including at least what is rewritable with every order and what is not rewritable. At the laboratory, the print order information as to the number of prints, which is rewritten with every order, is automatically deleted or reset before a roll of the photographic film is returned to the user after printing. As a result, it can be prevented that the reorder is placed in such a state that the previous printing information remains. In addition, the additional bit is provided for the print order information recorded in the magnetic track, and the information indicating whether the print order information is valid or invalid. So, necessary information (for example, the close-up information, etc.) remains whereas the laboratory does not accept the information. Therefore, when the film image is automatically regenerated, there is no need to input the close-up information for the second time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of accepting a print order in which a first magnetic track for a user and a second magnetic track for a laboratory are provided on a roll of photographic film and print order information is recorded in said first and second magnetic tracks, comprising the steps of:

providing said first and second magnetic tracks respectively with a record region in which first and second renewal codes are recorded;

renewing and recording said first renewal code every time said print order information is recorded in said first magnetic track to provide an indication that a new print order has been stored on said roll of photographic film; and replacing said second renewal code which is recorded in said second magnetic track with said first renewal code at least before the laboratory returns said roll of photographic film to the user.

2. The method of accepting a print order according claim 1, further comprising the steps of:

comparing said first renewal code with said second renewal code before replacing said second renewal code with said first renewal code at said laboratory, and judging whether print order information recorded in said first magnetic track has been replaced or not from the result of said comparing step so as to indicate a judged result at said laboratory.

3. The method of accepting a print order according to claim 1, further comprising the steps of:

dividing said first and second magnetic tracks into a leader track which is located in a forward end part of the film and a plurality of frame tracks which are located at the rear of said leader track and which respectively correspond to each frame;

recording the print order information which is required for printing each frame in said frame tracks; and recording said first and second renewal codes in said first and second magnetic tracks respectively.

4. A method of accepting a print order in which print order information is recorded in a magnetic track on a roll of photographic film, comprising the steps of:

providing said magnetic track with a record region for a flag which indicates that a processing for an order is completed;

clearing said flag at the time of renewing said print order information; and setting said flag at a laboratory.

5. The method of accepting a print order according to claim 4, further comprising the step of:

judging whether said flag indicating that a processing for an order is completed has been raised or not before setting the flag so as to indicate a judged result at said laboratory.

6. The method of accepting a print order according to claims 4, wherein;

said magnetic track is divided into a leader track which is located in a forward end part of the film and a frame track which is located at the rear of said leader track and corresponds to each frame;

print order information which is required for printing each frame is recorded in said frame track; and a record region in which said flag indicating that a processing for an order is completed is provided in said leader track.

7. A method of accepting a print order in which a first magnetic track for a user and a second magnetic track for a laboratory are provided on a roll of photographic film and print order information is recorded in said first and second magnetic tracks, comprising the steps of:

judging at a laboratory whether there is an order by means of print order information recorded in said first magnetic track;

preferentially using the print order information recorded in said first magnetic track when said step of judging indicates that there is an order in said first magnetic track, and preferentially using the print order information recorded in said second magnetic track when said step of judging indicates that there is no order in said first magnetic track; and writing preferentially-used print order information in said second magnetic track.

8. The method of accepting the print order according to claim 7, further comprising the step of:

replacing only information corresponding to a print order placed by means of an order sheet within said print order information which is preferentially used with information on said order sheet so as to be recorded in said second magnetic track when there is a print order placed by the order sheet.

9. A method of accepting an order for printing in which a first magnetic track for a user and a second magnetic track for a laboratory are provided on a roll of photographic film and print order information is recorded in said first and second tracks, comprising the steps of:

recording print order information in said first magnetic track and recording a first renewal code which is renewed every time the print order information is recorded;

comparing said first renewal code recorded in said first magnetic track with a second renewal code recorded in said second magnetic track at a laboratory;

preferentially using said print order information recorded in said first magnetic track when said first and second renewal codes do not correspond to each other, and preferentially using said print order information recorded in said second magnetic track when said first and second renewal codes correspond to each other; and writing said print order information which is preferentially used in said second magnetic track, and replacing said second renewal code with said first renewal code.

10. The method of accepting the print order according to claim 9, further comprising the step of:

replacing only information corresponding to a print order placed by means of an order sheet within said print order information which is preferentially used with information on said order sheet so as to be recorded in said second magnetic track when there is a print order placed by means of an order sheet.

11. A method of accepting an order for printing, in which a first magnetic track for a user and a second magnetic track for a laboratory are provided on a roll of photographic film and print order information is recorded in said first and second magnetic tracks, comprising the steps of:

providing said first magnetic track with a record region for a flag which indicates that a processing for an order is completed, and clearing said flag when said print order information is recorded;

judging whether there is an order by said print order information recorded in said first magnetic track by making use of said flag which is set or cleared;

preferentially using said print order information recorded in said first magnetic track when said step of judging indicates that there is an order recorded in said first magnetic track, and preferentially using said print order information recorded in said second magnetic track when said step of judging indicates that there is no order in said first magnetic track; and writing said print order information which is preferentially used in said second magnetic track, and setting said flag.

12. The method of accepting the print order according to claim 11, further comprising the step of:

replacing only information corresponding to a print order placed by means of an order sheet within said print order information which is preferentially used with information on said order sheet so as to be recorded in said second magnetic track when there is a print order placed by means of the order sheet.

13. A method of accepting a print order, in which print order information is recorded in first and second magnetic tracks on a roll of photographic film, comprising the steps of:

classifying said print order information recorded in said first and second magnetic tracks into plural kinds of information which include at least information to be rewritten for every order and information not to be rewritten for every order; and automatically deleting or resetting information with is to be rewritten for every order after printing and before returning said photographic film to a user.

14. A method of accepting and processing a print order, in which print order information is recorded on a roll of photographic film, comprising the steps of:

providing on said roll of photographic film an additional bit for said print order information;

recording in said additional bit an indication that said print order information is either valid or invalid; and determining that said print order information is used in processing said print order when said additional bit indicates validity and is not used in processing said print order when said additional bit indicates invalidity.

15. A method of processing a film print order specifying images to be reproduced by a reproducing device, said print order being stored directly on said film through user input or being initially provided on a print order sheet, said film including an indicator which signals whether a new print order has been stored directly on said film through user input, said method comprising the steps of;

reading said indicator from said film;

determining from said indicator whether a new print order has been stored directly on said film through user input; and reproducing images stored on said film as specified by print order information which is either stored directly on said film through user input or has been initially provided on a print order sheet based on the result of said determining step.

16. A method of processing a film print order as defined in claim 15, wherein said indicator includes a first renewal code which is renewed each time a user inputs a print order on said film and a second renewal code which is set by said reproducing device upon processing a print order.

17. A method of processing a film print order as defined in claim 16, wherein said determining step compares said first renewal code and said second renewal code to determine whether said first and second renewal codes are the same, a determination that said first and second renewal codes are the same indicating that no new print order has been directly stored on said film through user input.

18. A method of processing a film print order as defined in claim 16, wherein said second renewal code is set equal to said first renewal code upon processing a new print order.

19. A method of processing a film print order as defined in claim 15, wherein said indicator includes a flag having two possible states, the state of said flag being altered when a new print order is stored directly on said film through user input.

20. A method of processing a film print order as defined in claim 19, wherein the state of said flag is altered again upon processing a new print order which had been stored directly on said film through user input.

21. A method of processing a print order as defined in claim 15, wherein, when it is determined that a new print order has been stored directly on said film through user input, the print order directly stored on said film is used for reproduction, and when it is determined that no new print order has been directly stored on said film through user input, print order information initially provided on a print order sheet is used for reproduction.

22. A system for processing a film print order specifying images to be reproduced by a reproducing device, said print order being stored directly on said film through user input or being initially provided on a print order sheet, said film including an indicator which signals whether a new print order has been stored directly on said film through user input, said system comprising:

reading means for retrieving said indicator from said film;

judging means for determining from said indicator whether a new print order has been stored directly on said film through user input; and reproducing means for reproducing images stored on said film as specified by print order information which is either stored directly on said film through user input or has been initially provided on a print order sheet based on the determination result of said judging means.

23. The method of accepting a print order according to claim 1, further comprising the steps of:

comparing said first renewal code with said second renewal code; and detecting whether printing has been performed based on said print order information recorded in said first magnetic track, depending on whether said first renewal code corresponds to said second renewal code.

24. A system for processing a roll of photographic film, the film having a first magnetic track for a user and a second magnetic track for a laboratory for storing print order information, the first track having a record region in which a first renewal code is recorded, the second track having a record region in which a second renewal code is recorded, the first renewal code being renewed every time the print order information is recorded in the first magnetic track to indicate that a new print order has been stored on the roll of photographic film, said system comprising:

input means for accepting the roll of photographic film;

printing means for generating prints in accordance with the recorded print order information; and resetting means for replacing the second renewal code with the first renewal code at least before the laboratory returns the roll of photographic film to the user.

25. A system for processing a roll of photographic film, the film having a magnetic track in which print order information is recorded, the magnetic track having a record region reserved for a flag, the flag indicating that a print order processing has been completed and being cleared upon renewal of the print order information, said system comprising:

input means for accepting the roll of photographic film;

printing means for generating prints in accordance with the recorded print order information; and flagging means for setting the flag to indicate that the recorded print order information has been processed.

26. A system for processing a roll of photographic film, the film having a first magnetic track for a user and a second magnetic track for a laboratory for storing print order information, the first track having a record region in which a first renewal code is recorded, the second track having a record region in which a second renewal code is recorded, the second renewal code being replaced with the first renewal code after prints are generated for the print order, said system comprising:

input means for accepting the roll of photographic film;

print order information input means for recording user selected print order information in the first magnetic track of the roll of photographic film; and renewal means for renewing the first renewal code in the first magnetic track to indicate that a new print order has been stored on the roll of photographic film.

27. A system for processing a roll of photographic film, the film having a magnetic track in which print order information is recorded, the magnetic track having a record region reserved for a flag, the flag indicating that a print order processing has been completed, said system comprising:

input means for accepting the roll of photographic film;

print order information input means for recording print order information in the magnetic track of the roll of photographic film in accordance with user input; and flag clearing means for clearing the flag to indicate that new print order information has been recorded on the roll of photographic film.

28. A system for processing a roll of photographic film, the film including a first magnetic track for a user and a second magnetic track for a laboratory, print order information being recorded in the first and second magnetic tracks, said system comprising:

input means for accepting the roll of photographic film;

judging means for determining whether there is a print order by means of print order information recorded in the first magnetic track;

selecting means for selecting the print order information recorded in the first magnetic track when said judging means indicates that there is an order in the first magnetic track, and selecting the print order information recorded in the second magnetic track when said judging means indicates that there is no order in the first magnetic track; and writing means for writing selected print order information in the second magnetic track.

29. A system for processing a roll of photographic film, the film having a first magnetic track for a user and a second magnetic track for a laboratory, print order information being recorded in the first and second tracks, the first magnetic track having a first renewal code which is renewed every time the print order information is recorded, said system comprising:

input means for accepting the roll of photographic film;

judging means for comparing the first renewal code recorded in the first magnetic track with a second renewal code recorded in the second magnetic track;

selection means for selecting the print order information recorded in the first magnetic track when the first and second renewal codes do not correspond to each other, and selecting the print order information recorded in the second magnetic track when the first and second renewal codes correspond to each other; and writing means for writing the selected print order information in the second magnetic track and replacing the second renewal code with the first renewal code.

30. A system for processing a roll of photographic film, the film having a first magnetic track for a user and a second magnetic track for a laboratory, print order information being recorded in the first and second magnetic tracks, the first magnetic track having a record region reserved for a flag which indicates that a processing for an order is completed, the flag being cleared when the print order information is recorded, said system comprising:

input means for accepting the roll of photographic film;

judging means for determining whether there is an order recorded in the first magnetic track by judging whether the flag is set or cleared;

selection means for selecting the print order information recorded in the first magnetic track when said judging means indicates that there is an order recorded in said first magnetic track, and selecting the print order information recorded in the second magnetic track when said judging means indicates that there is no order in the first magnetic track; and writing means for writing the selected print order information in the second magnetic track and setting the flag.

31. A system for processing a roll of photographic film, the film including first and second magnetic tracks, print order information being recorded in the first and second magnetic tracks, the print order information being classified into plural kinds of information which includes at least information to be rewritten for every order and information not to be rewritten for every order, said system comprising:

input means for accepting the roll of photographic film;

printing means for generating prints in accordance with the classified print order information; and means for automatically deleting or resetting information classified as information to be rewritten for every order after printing and before returning the photographic film to a user.

32. A system for processing a roll of photographic film in which print order information is recorded, the film being provided with an additional bit for print order information indicating whether the print order information is valid or invalid, said system comprising:

input means for accepting the roll of photographic film;

judging means for determining that the print order information is used in processing the print order when the additional bit indicates validity and determining that the print order information is not used in processing the print order when the additional bit indicates invalidity; and printing means for generating prints in accordance the results of said judging means.

* * * * *